United States Patent
Joshua et al.

(10) Patent No.: US 12,282,959 B2
(45) Date of Patent: *Apr. 22, 2025

(54) METHOD, APPARATUS AND SYSTEM FOR TIME STAMPING AND SEQUENCING DATA ITEMS

(71) Applicant: BGC PARTNERS, L.P., New York, NY (US)

(72) Inventors: Jonathan Joshua, Scotch Plains, NJ (US); Bijoy Paul, New York, NY (US)

(73) Assignee: BGC PARTNERS, L.P., New York, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 18/413,362

(22) Filed: Jan. 16, 2024

(65) Prior Publication Data

US 2024/0161191 A1 May 16, 2024

Related U.S. Application Data

(63) Continuation of application No. 17/818,773, filed on Aug. 10, 2022, now Pat. No. 11,915,315.

(51) Int. Cl.
*G06Q 40/04* (2012.01)
*H04L 47/193* (2022.01)
*H04L 47/56* (2022.01)

(52) U.S. Cl.
CPC .......... *G06Q 40/04* (2013.01); *H04L 47/193* (2013.01); *H04L 47/564* (2013.01)

(58) Field of Classification Search
CPC ...... G06Q 40/04; H04L 47/193; H04L 47/564
See application file for complete search history.

(56) References Cited

U.S. PATENT DOCUMENTS

| | | | |
|---|---|---|---|
| 11,088,959 B1* | 8/2021 | Amicangioli | H04L 47/562 |
| 11,451,647 B2* | 9/2022 | Lariviere | H04L 69/08 |
| 2013/0262287 A1* | 10/2013 | Parsons | G06Q 40/04 705/37 |
| 2020/0034929 A1* | 1/2020 | Rao | H04J 3/065 |
| 2020/0228455 A1 | 7/2020 | Snowdon | |
| 2022/0377019 A1* | 11/2022 | Rao | H04L 47/6235 |

* cited by examiner

*Primary Examiner* — Bryan Y Lee

(57) ABSTRACT

Method, apparatus, and system may control chronological sequencing of data items received from a plurality of client computing devices, according to times of completion of transmission respectively from the client computing devices and distributing the data items according to the chronological sequencing to one or more destination computing devices with minimal latency. In an exemplary implementation, trade orders from participant computing devices may be distributed by an electronic trading platform with minimal latency to exchange gateways, based on time of transmission of the trade orders to the platform instead of time of receipt of the trade orders by the platform, thereby avoiding unfairness to those participants whose computing devices are located at greater distances from the platform than other computing devices respectively of other participants.

20 Claims, 9 Drawing Sheets

METHOD, APPARATUS AND SYSTEM FOR TIME STAMPING AND SEQUENCING DATA ITEMS

CROSS REFERENCE TO RELATED APPLICATIONS

This application is a continuation of U.S. patent application Ser. No. 17/818,773 filed Aug. 10, 2022, which is incorporated by reference herein in its entirety.

TECHNICAL FIELD

The present disclosure generally relates to controlling distribution of data items from multiple client devices that provides for fairness in distribution of the data items to one or more destination computing devices, based on time of completion of transmission of the data items respectively from the client devices.

BACKGROUND

Computing devices of respective entities exchange data with other computing devices of other respective entities over communication networks, for multitudes of applications. The speed of transfer of data between respective computing devices depends on network properties and processing operations along or associated with a communication path over which data is conveyed from one computing device to another device. For example, two client computing devices at different geographical origins, or at the same geographical origin, and from which a data item is transmitted respectively over communication paths having different network properties, such as a communication medium or communication protocol, may transmit a data item to another computing device. The times of receipt respectively of the data items at the other computing device depend on the network properties and the respective lengths of the communication paths between each of the client computing devices and the other computing device, and the times of transmission respectively from the client computing devices. In some communication network applications, a desired functionality is for the other computing device to distribute data items received from multiple client computing devices to one or more destination computing devices chronologically based on times of transmission of the data items respectively from the client computing devices. The differences in the lengths and the network properties of the communication paths, however, present technical difficulties at the other computing device to distribute the data items chronologically based on respective times of transmission.

In one example, in an electronic asset trading system, many trade orders for assets, such as financial assets including U.S. treasuries, or intangible assets, including cryptocurrencies, from multiple computing devices of respective clients, may be received over a short period of time, such as less than one microsecond, by a computing platform that facilitates submissions of the trade orders to one or more trading exchanges. The computing platform strives to provide fairness in distribution of the trade orders to the trading exchanges, based on the chronological times of submission of the trade orders from the computing devices of clients. Differences in network properties of, lengths of and processing operations along or associated with communication paths on which trade orders are conveyed, however, present technical difficulties at the computer platform to fairly distribute the trade orders to the trading exchanges chronologically based on times of submission of the orders at the computing devices respectively of the clients, without adversely affecting latency in transmission.

Accordingly, there exists a need for method, apparatus and system for electronic communication in communication networks that may compensate for differences in network properties, communication path lengths and processing operations associated with data transmission between computing devices, while minimizing latency, to provide for fairness in distribution of data items received at a computing platform from client computing devices, to one or more destination computing devices chronologically according to the times of submission respectively from the client computing devices.

SUMMARY

In accordance with an aspect of the present disclosure, a system may include at least one first programmable integrated circuit communicatively coupled to a plurality of first transmission control protocol (TCP) client circuits, in which each of the first TCP client circuits is configured to receive order data from a market participant, in which the at least one first programmable integrated circuit is configured to: receive, from each of the first TCP client circuits, a stream of data packets representative of at least one order; and for each order of the at least one order, identify a last data byte (LDB) data packet in the stream of data packets containing an identifier indicating a LDB of a plurality of data bytes forming the order; determine a time stamp for the order based on a time indicated by a time stamp clock at a time of receipt of the LDB data packet of the order at the at least one first programmable integrated circuit; and generate at least one order message for the order, in which the at least one order message indicates the time stamp for the order; at least one processor configured to: for each order for which at least one order message is generated: determine an updated time stamp based on a time offset associated with a given first TCP client circuit of the first TCP client circuits from which the order is received, in which the time offset corresponds to a network path extending from the given first TCP circuit client to the at least one first programmable integrated circuit, and in which each of the first TCP client circuits has a time offset corresponding to a network path extending respectively from the first TCP client circuit to the at least one first programmable integrated circuit; and generate an updated order message indicating the updated time stamp; and a sequencer of at least one second programmable integrated circuit configured to: receive a plurality of updated order messages for the respective orders; assign a sequencer time stamp to each of the respective orders corresponding to a time indicated by a sequencer clock at a time of receipt of the updated order message corresponding to the respective order at the sequencer; in a first queue, order the respective orders in time sequence, starting with an earliest time, based on the updated time stamps; in a second queue, order the respective orders in time sequence, starting with an earliest time, based on the sequencer time stamps; compare a time of the sequencer clock with the sequencer time stamps of the respective orders in the second queue, when, for a given order in the second queue, the time of the sequencer clock is determined to be same as or after a sum of the sequencer time stamp for the given order and a hold delay: remove the given order from the second queue; interleave into an output stream, in time sequence order starting with an earliest time based on a respective updated time stamp, the updated order message of the given order and an updated order message of each other order in the first queue, if any, having an updated time stamp earlier than the updated time stamp of the given order; remove, from the first queue, the given order and, if in the first queue, the each other order; and remove, from the second queue, the each other order, if in the second queue; and a fanout circuit of the at least one second programmable integrated circuit communicatively coupled to a plurality of TCP server circuits, in which the fanout circuit is configured to: for each order represented in the output stream, instruct at least two of the TCP server circuits to simultaneously transmit a second stream of output data packets representative of the order represented in the output stream.

In accordance with an aspect of the present disclosure, an apparatus may include: at least one programmable hardware device configured to: receive, from each of plurality of first transmission control protocol (TCP) client circuits, at least one TCP segment representative of at least one data item; and for each data item, identify a last data byte (LDB) data packet in a given TCP segment containing an identifier indicating a LDB of a plurality of data bytes forming the data item; determine a time stamp for the data item based on a time indicated by a local clock at a time the LDB data packet of the data item is received at the at least one programmable hardware device; and generate at least one data item message for the data item, in which the at least one data item indicates the time stamp for the data item; and at least one processor configured to: for each data item for which at least one data item message is generated: determine an updated time stamp based on a time offset associated with a given first TCP client circuit of the first TCP client circuits from which the data item is received, in which the time offset corresponds to a network path extending from the given first TCP circuit client to the at least one programmable hardware device, and in which each of the first TCP client circuits has a time offset corresponding to a network path extending respectively from the first TCP client circuit to the at least one programmable hardware device; and generate an updated data item message indicating the updated time stamp; and in which the at least one programmable hardware device is configured to: assign a sequencer time stamp to each data item of an updated data item message having a time indicated by a sequencer clock at a time of receipt of the updated data item message at a sequencer of the at least one programmable hardware device; for each data item assigned a sequencer time stamp, in a first queue, order the data item in time sequence, starting with an earliest time, based on the updated time stamp; in a second queue, order the data item in time sequence, starting with an earliest time, based on the sequencer time stamp; for a given data item in the second queue, when the time of the sequencer clock is determined to be same as or after a sum of the sequencer time stamp for the given data item and a hold delay: remove the given data item from the second queue; include in an output stream, in time sequence order starting with an earliest time based on a respective updated time stamp, the updated data time message of the given data item and an updated data item message of each other data item in the first queue, if any, having an updated time stamp earlier than the updated time stamp of the given data item; remove, from the first queue, the given data item and, if in the first queue, the each other data item; and remove, from the second queue, the each data item, if in the second queue; and for each data item represented in the output stream, instruct at least two of a plurality of TCP server circuits to simultaneously transmit a second stream of output data packets representative of the data item represented in the output stream.

In accordance with an aspect of the present disclosure, a method may include: controlling, by at least one programmable hardware device: receiving, from each of plurality of first transmission control protocol (TCP) client circuits, at least one TCP segment representative of at least one data item; and for each data item, identifying a last data byte (LDB) data packet in a given TCP segment containing an identifier indicating a LDB of a plurality of data bytes forming the data item; determining a time stamp for the data item based on a time indicated by a local clock at a time the LDB data packet of the data item is received at the at least one programmable hardware device; and generating at least one data item message for the data item, in which the at least one data item indicates the time stamp for the data item; and controlling, by at least one processor: for each data item for which at least one data item message is generated: determining an updated time stamp based on a time offset associated with a given first TCP client circuit of the first TCP client circuits from which the data item is received, in which the time offset corresponds to a network path extending from the given first TCP circuit client to the at least one programmable hardware device, and in which each of the first TCP client circuits has a time offset corresponding to a network path extending respectively from the first TCP client circuit to the at least one programmable hardware device; and generating an updated order message indicating the updated time stamp; and controlling, by the at least one programmable hardware device: assigning a sequencer time stamp to each data item of an updated data item message having a time indicated by a sequencer clock at a time of receipt of the updated data item message at a sequencer of the at least one programmable hardware device; for each data item assigned a sequencer time stamp, in a first queue, ordering the data item in time sequence, starting with an earliest time, based on the updated time stamp; in a second queue, ordering the data item in time sequence, starting with an earliest time, based on the sequencer time stamp; for a given data item in the second queue, when the time of the sequencer clock is determined to be same as or after a sum of the sequencer time stamp for the given data item and a hold delay: removing the given data item from the second queue; including in an output stream, in time sequence order starting with an earliest time based on a respective updated time stamp, the updated data time message of the given data item and an updated data item message of each other data item in the first queue, if any, having an updated time stamp earlier than the updated time stamp of the given data item; removing, from the first queue, the given data item and, if in the first queue, the each other data item; and removing, from the second queue, the each data item order, if in the second queue; and for each data item represented in the output stream, instructing at least two of a plurality of TCP server circuits to simultaneously transmit a second stream of output data packets representative of the data item represented in the output stream.

DETAILED DESCRIPTION

Figure 1:
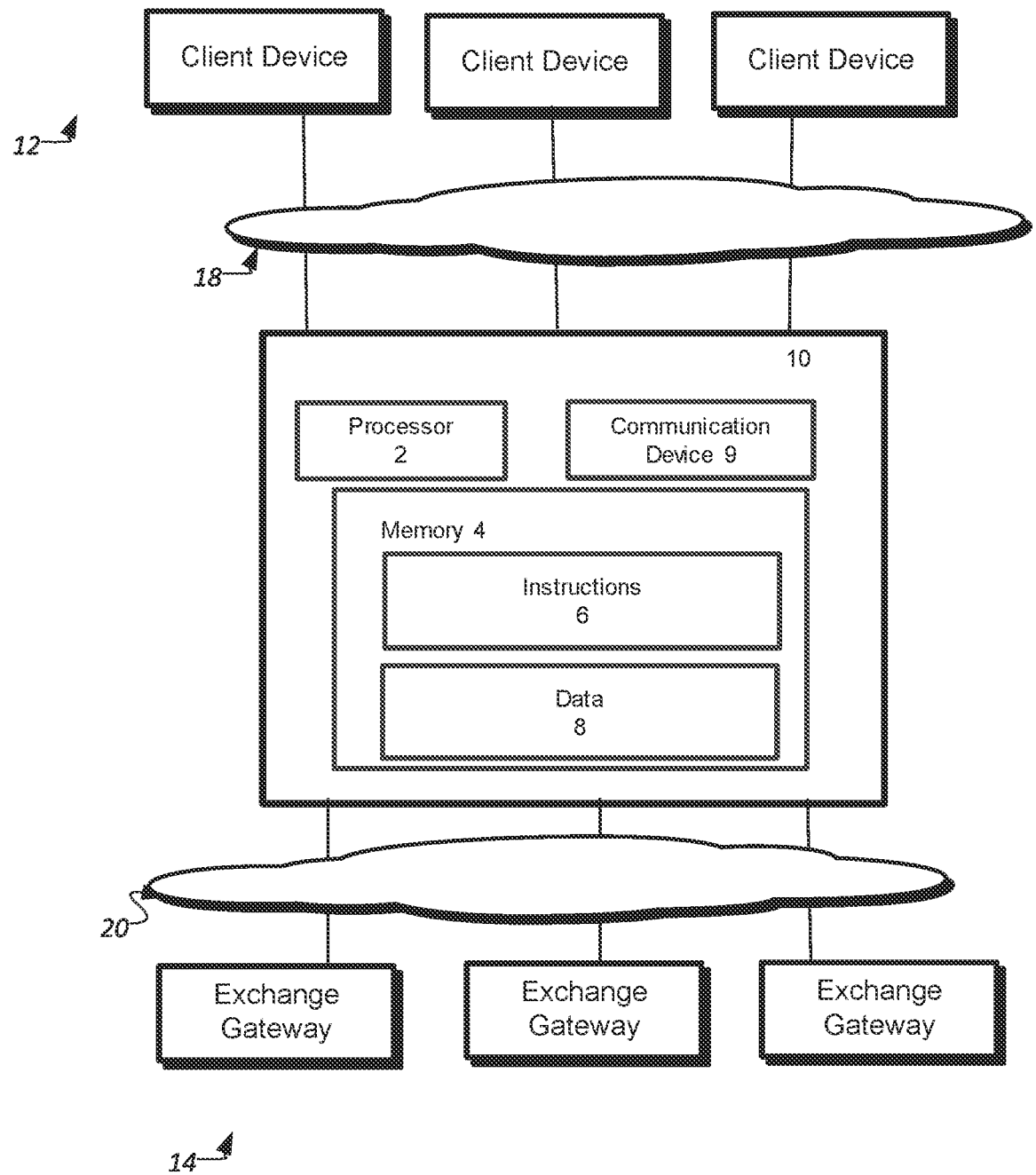
FIG. 1 is a block diagram of an exemplary computing apparatus, according to the present disclosure.

The technology of the present disclosure relates to, by way of example, a computer and networking architecture that may control chronological sequencing of data items received from a plurality of client computing devices, according to times of submission respectively from the client computing devices and distributing the data items according to the chronological sequencing to one or more destination computing devices with minimal latency. In one embodiment, a computing system may include an architecture containing at least one programmable hardware device, for example, a re-programmable logic device such as a field programmable gate array (FPGA), and at least one processor, that determines time stamps for data items received from respective client computing devices based on time of receipt of the data items at the FPGA and time offsets that account for differences in network properties and lengths of communication paths extending from the client computing devices, such as Transport Control Protocol (TCP) client circuits thereof, to the FGPA, and generates an output stream containing the data items in chronological sequence, based on times of completion of transmission of the data items respectively from the client computing devices as indicated by the time stamps and applying a hold delay to ensure all data items received are inserted into the output stream, while minimizing latencies.

In one exemplary embodiment, the computing system may control chronologically sequenced distribution of trade orders as the data items with minimal latency, where the trade orders may be transmitted in one or more TCP segments from TCP client circuits to a time stamp circuit as at least one FPGA, an order entry gateway as at least one processor may generate order messages for the respective orders based on time stamps determined by the time stamp circuit and time offsets respectively corresponding to the TCP client circuits, and a sequencer and fanout circuit as at least one FPGA may generate an output stream including updated order messages corresponding respectively to the orders in a chronological sequence, based on the time stamps, the time offsets and application of a hold delay, and cause transmission from one or more TCP server circuits a stream of output data packets representative of the orders in the output stream, according to the chronological sequence.

It is to be understood that the features in accordance with the present disclosure may be applied to sequencing distribution of data items other than financial data items, such as trade orders, transmitted from multiple client computing devices in applications requiring chronologically sequenced distribution of data items from respective client computing devices to one or more destination computing devices based on chronological time of transmission from the client computing devices, with low latency, such as, for example, real-time streaming of video or audio data, such as in interactive multi-player games, or event data from sensors, such as sensors in an internet of things ("IOT") network including health device sensors, traffic device sensors, etc.

The present disclosure may be implemented using a combination of computer hardware and computer software to form a specialized machine capable of performing operations. Embodiments of the present disclosure may be performed utilizing a combination of central processing units (CPUs), physical memory, physical storage, electronic communication ports, electronic communication lines and other computer hardware. The computer software may include at least a computer operating system and specialized computer processes described herein.

In the present disclosure, certain specific details are set forth to provide a thorough understanding of various disclosed embodiments. However, one skilled in the relevant art will recognize that embodiments may be practiced without one or more of these specific details, or with other methods, components, etc. In other instances, well-known structures associated with an electronic trading system have not been shown or described in detail to avoid unnecessarily obscuring descriptions of the embodiments.

The aspects, features and advantages of the present disclosure will be appreciated when considered with reference to the following description of examples and accompanying figures. In describing the exemplary embodiments of the disclosure illustrated in the drawings, specific terminology will be used for the sake of clarity. However, the disclosure is not intended to be limited to the specific terms used.

Example Systems

FIG. 1 illustrates a block diagram of an exemplary computing apparatus 10, in accordance with the present disclosure. The apparatus 10 may be communicatively coupled to a plurality of client devices 12 as data sources, such as computing devices at which data items, for example, electronic trading orders, may be entered, and a plurality of computing devices 14 as data recipients of the data items, such as exchange gateways of computing platforms as asset trading exchanges that may be the desired destinations of the trading orders. In some embodiments, advantageously according to the present disclosure, the apparatus 10 may perform processing functions that control sequencing the data items from a plurality of client devices 12 in a chronological sequence according to times of completion of transmission of the data items respectively from the client devices, and distributing the data items to one or more computing devices 14 according to the chronological sequence, to facilitate receipt, processing and distribution of the data items with low latency and that minimizes usage of network bandwidth, processing resources and memory resources, as described in detail below.

Referring to FIG. 1, the computing apparatus 10 may be in the form of a computing device that includes one or more processors 2, one or more memory 4, and other components commonly found in computing devices. In one embodiment, the one or more processors 2 may include or be configured to operate as one or more servers.

The memory 4 may store information accessible by the one or more processors 2, including instructions 6 that may be executed by the one or more processors 2.

The one or more processors 2 may include an architecture configured to include a programmable hardware device, such as a field programmable field array ("FPGA"), an application specific integrated circuit ("ASIC") or system on chip ("SoCs"). In one embodiment, the architecture may be hardwired on a substrate. In one embodiment, the one or more processors 2 may be any type of processor, such as a CPUs from Intel, AMD, and Apple.

Memory 4 may also include data 8 that can be stored, manipulated, or retrieved by the processor. The data 8 may also be used for executing the instructions 6 and/or for performing other functions. The memory 4 may be any type of non-transitory media readable by the one or more processors, such as a hard-drive, solid state hard-drive, memory card, ROM, RAM, DVD, CD-ROM, write-capable, read-only memories, etc.

The instructions 6 may be any set of instructions capable of being read and executed by the one or more processors 2. The instructions may be stored in a location separate from the computing device, such as in a network attached storage drive, or locally at the computing device. The terms "instructions," "functions," "application," "steps," and "programs" may be used interchangeably herein. The instructions residing in a non-transitory memory may comprise any set of instructions to be executed directly (such as machine code) or indirectly (such as scripts) by processor 2. In this regard, the terms "instructions," "scripts," or "modules" may be used interchangeably herein. The computer executable instructions may be stored in any computer language or format, such as in object code or modules of source code. Furthermore, it is understood that the instructions may be implemented in the form of hardware, software, or a combination of hardware and software and that the examples herein are merely illustrative.

Data 8 may be stored, retrieved and/or modified by the one or more processors 2 in accordance with the instructions 6. Such data may be stored in one or more formats or structures, such as in a relational or non-relational database, in a SQL database, as a table having many different fields and records, XLS, TXT, or XML documents. The data may also be formatted in any computing device-readable format. In some embodiments the data may be encrypted.

The apparatus 10 may include a communication device 9 configured to provide wired or wireless communication capabilities.

Referring to FIG. 1, the apparatus 10 may be communicably interconnected with the client devices 12 over a communication network 18, and with computing devices 14 as exchange gateways over a communication network 20. The communication network 18 may be a communication network having predetermined network characteristics, such as bandwidth, communication protocol, communication paths and communication path lengths, and include a local area network ("LAN"), wide area network ("WAN"), virtual private network, local Ethernet network, a private network using a proprietary communication protocol proprietary or like network. The communication network 20 may be a local area network ("LAN"), a wide area network ("WAN"), or the Internet, etc. The communication network 20 and intervening nodes thereof may use various protocols including virtual private networks, local Ethernet networks, private networks using communication protocols proprietary to one or more companies, cellular and wireless networks, HTTP, and various combinations of the foregoing. In addition, the networks 18 and 20 may utilize a variety of networking protocols now available or later developed including, but not limited to, TCP/IP based networking protocols.

In one embodiment, the computing apparatus 10 may include the communication network 18 and at least a portion of the client devices 12. In one embodiment, the portion of the client devices 12 included in the computing apparatus 10 may be circuitry from which data packets representative of a data item are transmitted over the communication network 18 to another component of the computing apparatus 10.

FIG. 1 illustrates the components of the apparatus 10 as being single components, however, the components may comprise multiple programmable hardware devices such as FPGAs, processors, computers, computing devices, or memories that may or may not be stored within the same physical housing. For example, the memory may be a hard drive or other storage media located in housings different from that of the apparatus 10. Accordingly, references to a programmable hardware device, processor, computer, computing device, or memory herein will be understood to include references to a collection of processors, computers, computing devices, or memories that may or may not operate in parallel. Further, although some functions described below are indicated as taking place on a single computing device having a single processor, various aspects of the subject matter described herein may be implemented by a plurality of computing devices in series or in parallel. For example, in one embodiment, functions performed by the apparatus 10 as described below may at least be partially performed at another computing apparatus having the same or similar components as the apparatus 10. In one embodiment, functions described herein as performed by the apparatus 10 may be distributed among one or more computing devices (servers) that operate as a cloud system.

Although only a single computing apparatus 10 (computer) is depicted herein it should be appreciated that a computing apparatus in accordance with the present disclosure may include additional interconnected computers and reprogrammable hardware devices, such as FPGAs. It should further be appreciated that apparatus 10 may be an individual node in a network containing a larger number of computers.

In one embodiment, the apparatus 10 may include all the components normally used in connection with a computer. For example, apparatus 10 may have a keyboard and mouse and/or various other types of input devices such as pen-inputs, joysticks, buttons, touch screens, etc., as well as a display, which could include, for instance, a CRT, LCD, plasma screen monitor, TV, projector, etc.

Figure 2:
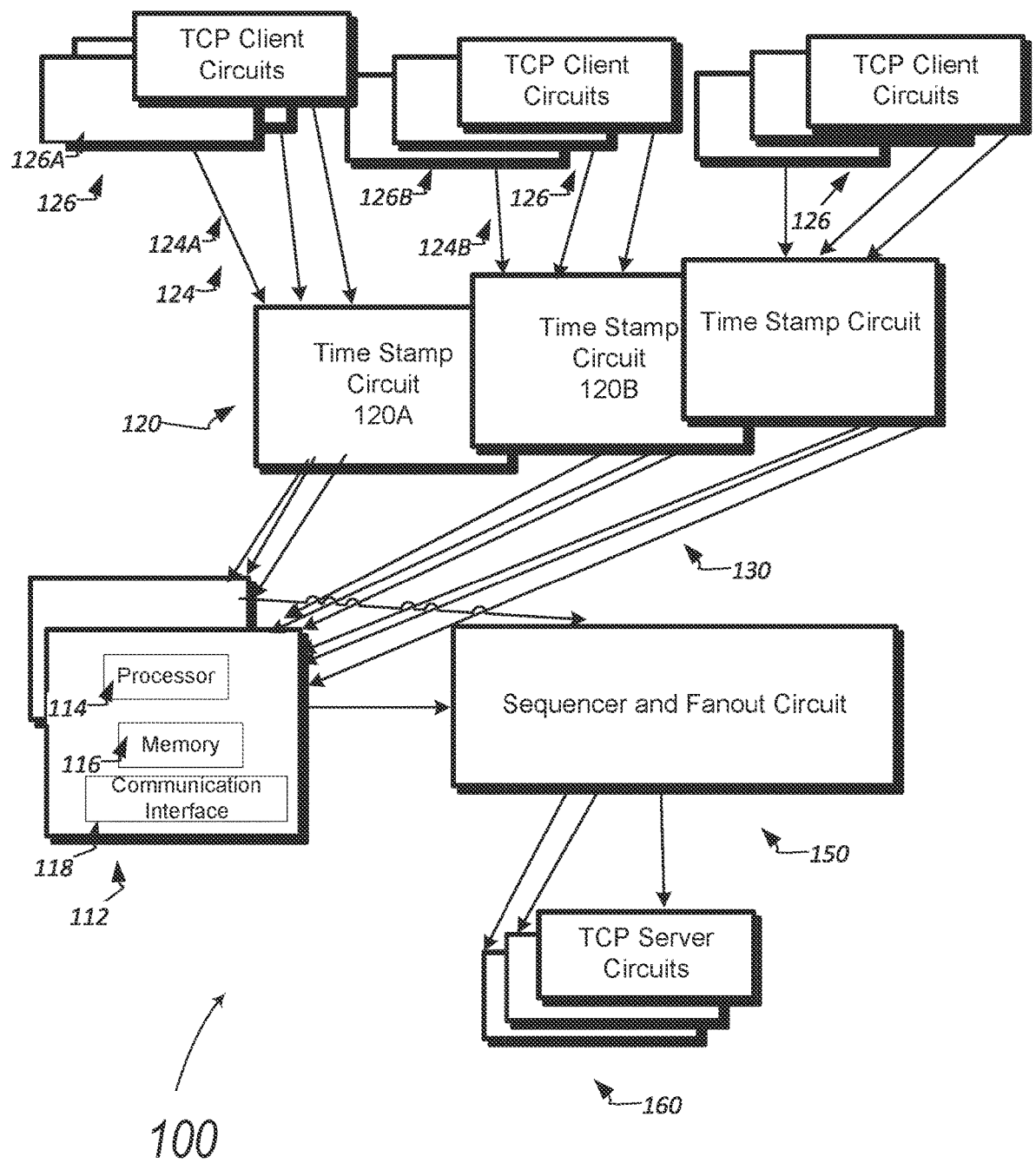
FIG. 2 is a block diagram of an exemplary sequencing system, according to the present disclosure.

Referring to FIG. 2, in some embodiments, the apparatus 10 may be configured as a system 100 to implement specific functions and operations in accordance with the present disclosure. In some embodiments, the system 100 may be programmed with programs to perform some or all of the functions and operations described herein.

Referring to FIG. 2, the system 100 may include servers 112, each including a processor 114, a memory 116 and a communication interface 118. The memory 116 may be configured to store instructions to implement specific functions and operations, and data related to data items and sequencing of data items, in accordance with the present disclosure. In one embodiment, each of the components of the system 100 may include a processor and memory including instructions that implement functions of the respective component, as described below.

The system 100 may include a plurality of time stamp circuits 120 each configured as or to include an FPGA, and network paths 124 communicatively coupling each of the time stamp circuits 120 respectively to one or more TCP client circuits 126. Each server 112 may be communicatively coupled with one or more time stamp circuits 120 over communication paths 130. In one embodiment, each network path 124 may be a data path independent of any other data path.

In one embodiment, a time stamp circuit 120 may be communicatively coupled to one or more TCP client circuits 126, and each TCP client circuit 126 may be communicatively coupled over a predetermined network path 124 with a time stamp circuit 120. For example, a TCP client circuit 126A may be communicatively coupled with a time stamp circuit 120A over a network path 124A, and a TCP client circuit 126B may be communicatively coupled with a time stamp circuit 120B over a network path 124B. The time stamp circuits 120 may be configured to determine a time stamp for a data item transmitted from a TCP client circuit, where the time stamp is based on a time of an electronic clock, which is a local clock of the system 100, when the entirety of the data forming the data item is received at the time stamp circuit.

In one embodiment, the data item may be an order of an order session established between a client device and the system 100. The order of the order session may be transmitted as a stream of data packets in one or more TCP segments from a TCP client circuit over a predetermined network path 124 to a time stamp circuit 120, and a time stamp determined for the order may be based on a time that a data packet of a TCP segment containing a last data byte of a plurality of data bytes forming the order, transmitted from the TCP client circuit, is received at the time stamp circuit. In one embodiment, a server 112 or the time stamp circuit 120 may be configured to include and control an electronic clock as a local electronic clock of the system 100, and control associating a time of the electronic clock with each bit or byte of data of a TCP segment received at a time stamp circuit 120 and determining a time stamp for an order of the order session based on a time of the electronic clock when the data packet containing the last data byte of the order is received at the time stamp circuit.

In one embodiment, the system 100 may include a predetermined communication path 130 over which data on a predetermined network path 124 extending from a TCP client circuit 126 to a time stamp circuit 120 is conveyed to a server 112. In one embodiment, as discussed in detail below, data path information indicating that a predetermined data path extends from a specific TCP client circuit over a predetermined network path 124 to a predetermined time stamp circuit 120 may be utilized, such as by a server 112, to determine a predetermined time offset that is applicable to a data item transmitted from the predetermined TCP client circuit. A memory, such as the memory 116 of a server 112, may store the data path information and time offsets for the respective TCP client circuits. As discussed in detail below, time offsets for respective TCP client circuits may be utilized to account for and equalize differences in transmission durations among network paths extending between respective TCP client circuits and a time stamp circuit, and provide that data items, such as orders, respectively from the TCP client circuits received at a time stamp circuit may be arranged chronologically in a sequence, based on a time that an order is completely received at a time stamp circuit and a time offset corresponding to a TCP client circuit from which the order is received. In one embodiment, the data items in the sequence desirably are in chronological order of completion of transmissions of data items respectively from the TCP client circuits to a time stamp circuit of the system 100.

In addition, the system 100 may include a sequencer and fanout circuit 150 communicatively coupled with the servers 112 and a plurality of TCP server circuits 160. The servers 112 may be configured to determine an updated time stamp for a data item that accounts for transmission duration differences for the network paths extending from the respective TCP client circuits and is based on the time offset for the source TCP client circuit, and generate data item messages respectively for the data items received from the TCP client circuits indicating the updated time stamps. The sequencer and fanout circuit 150 may be configured to receive the data item messages from the servers 112 and arrange the data items respectively of the data item messages in a chronological sequence according to the updated time stamps. In addition, the sequencer and fanout circuit 150 may be configured to cause the TCP server circuits 160 to transmit the data items to one or more computing devices, in accordance with the chronological sequence of the data items.

In one embodiment, the sequencer and fanout circuit 150 may be configured to delay transmission of a data item indicated in the chronological sequence for a duration of a hold delay, to provide that data items transmitted over network paths 124 having the greatest transmission durations among the network paths 124 extending to the time stamp circuits from respective TCP client circuits may be included in the chronological sequence in an output stream and transmitted from TCP server circuits 160 before other data items, which have been transmitted over network paths having shorter transmission durations, are transmitted from the TCP server circuits 160. For example, a first network path extending from a first TCP client circuit may have a first transmission duration length and corresponding first time offset, and a second network path extending from a second TCP client circuit may have a second transmission duration length and corresponding second time offset, where the second time offset exceeds the first time offset. The hold delay may account for the difference between the first time offset and second time offset, such that a first order of a first order message from the first TCP client circuit may be included in an output stream with a second order of a second order message from the second TCP client, where transmission of the first order message from the first TCP client circuit is completed before transmission of the second order message from the second TCP client circuit is completed, but the first order message is completely received at a time stamp circuit of the system after the second order message is completely received at a time stamp circuit of the system. Advantageously, the hold delay may provide that the output stream includes both the first and second orders, such that the first and second order messages may be transmitted in a chronological sequence reflective of completion of transmission of an order from a TCP client circuit, namely, the first order may be distributed to a destination from the system prior to the second order.

For example, the second order message may be completely transmitted from a TCP client circuit one nanosecond after the first order message is completely transmitted from another TCP client circuit, the transmission durations for the first and second order messages to a time stamp circuit may be 30 ns and 5 ns respectively, and the first and second time offsets may be 30 ns and 5 ns, respectively. A hold delay of slightly greater than the difference between the time offsets, or 25 ns, may ensure that both the first and second orders are arranged chronologically in a sequence and represented respectively in order messages, according to the sequence, in an output stream.

In one embodiment, a server 112 or the sequencer and fanout circuit 150 may be configured to include and control an electronic clock (sequencer clock), and control determining a time stamp for a data item message generated for a data item, based on a time of the sequencer clock when the data item message is received at the sequencer and fanout circuit 150.

For ease of reference and convenience, the disclosure herein that the server 112 or another component of the system 100 may perform a function or operation, is a disclosure that a processor or circuitry of the server 112 or the another component of the system 100 may perform or control the performance of the function or operation.

Figure 3:
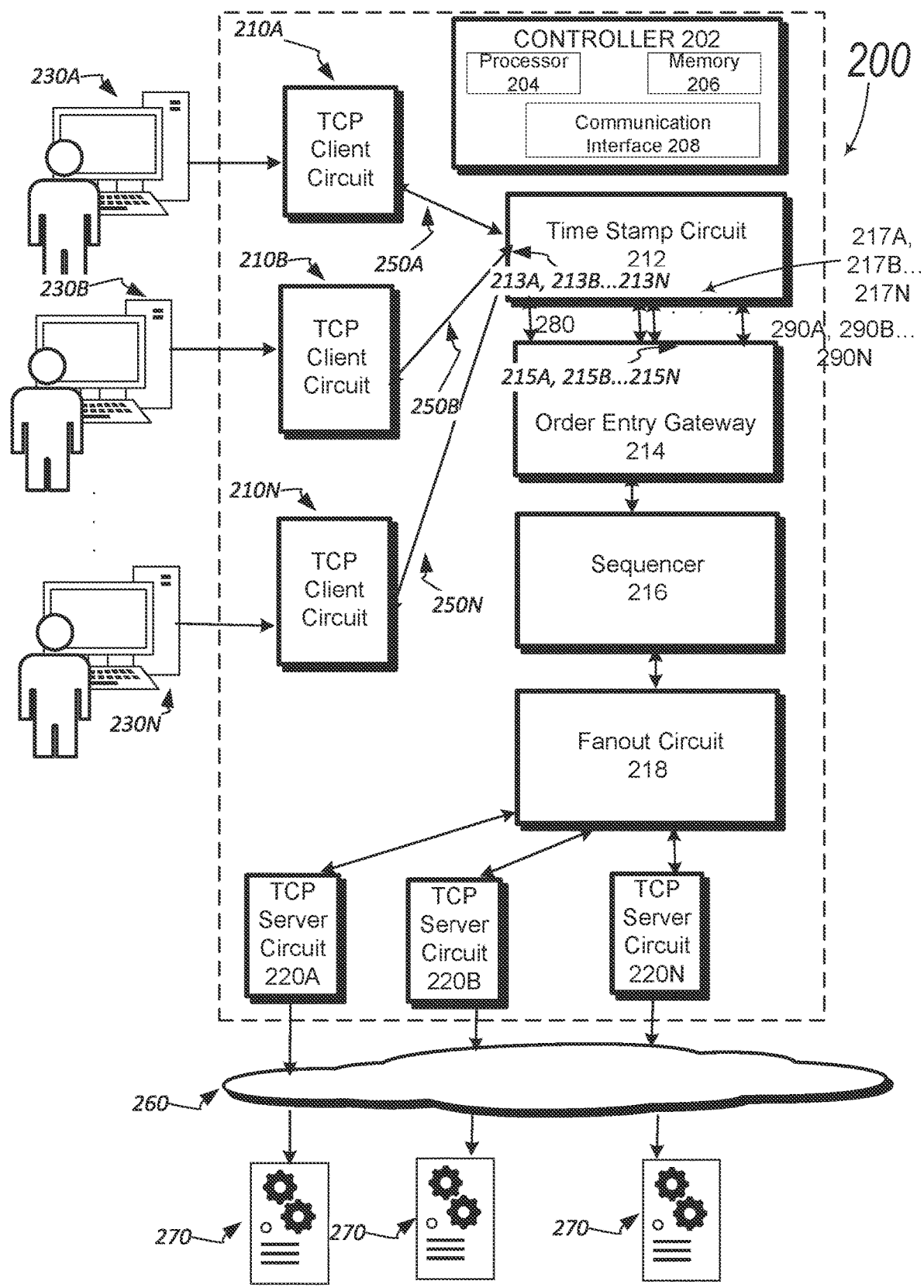
FIG. 3 is a block diagram of an exemplary sequencing system, according to the present disclosure.

For purposes of highlighting and illustrating the features of the present disclosure, a computing system 200 as shown in FIG. 3, which is an exemplary embodiment of the system 100 configured for an electronic asset trading application, to implement specific functions and operations in accordance with the present disclosure, is described below. In operation of the system 200, the data item, for example, may be an order for purchase or sale of an asset, and include details of or relating to the order, such as price, quantity, identity of an order session corresponding to the order, identity of a user, as a participant in financial market trading, that enters the order at a client device, and identification information of a client device at which the order is entered, etc.

The system 200 may include a controller 202 including at least one processor 204, a memory 206 and a communication interface 208. The controller 202 may be communicatively coupled with and configured to control TCP client circuits 210, a time stamp circuit 212, an order entry gateway 214, a sequencer 216, a fanout circuit 218 and TCP server circuits 220. The TCP server circuits 220 may be communicatively coupled over a communication network 260 with a plurality of computing devices 270, such as a trading exchange or a matching engine.

In one embodiment, the TCP client circuits 210 may be communicatively coupled with and configured as part of respective client devices 230. In one embodiment, a client device 230 may include a TCP client circuit 210.

The TCP client circuits 210A, 210B . . . 210N may be communicatively coupled over predetermined network paths 250A, 250B . . . 250N respectively with predetermined ports 213A, 213B . . . 213N of the time stamp circuit 212.

In one embodiment, the network paths 250 may constitute a high-speed signal transmission medium, such as optical fiber, electrical cable or the like. The network paths 250 may have predetermined network properties, which are based on a type of transmission medium of the network path, and different communication protocols may be used to transmit signals on respective network paths. The network properties and length of a predetermined network path, and a communication protocol used to transmit a data signal, such as a TCP segment as an order session message containing details of an order, along the network path, may determine a transmission duration for the data signal from one end of the network path at a TCP client circuit 210, and the other end of the network path at a predetermined port 213 of a time stamp circuit 212. Differences in the network properties and lengths of the respective network paths, and communication protocols used to transmit data signals on the respective network paths, may result in different transmission durations for the respective network paths from the TCP client circuits to respective ports of a time stamp circuit. For example, although each of two of the client devices 230 may cause a TCP order session message for an order to be transmitted completely at a same time from a respective TCP client circuit, the TCP segment(s) including all details of an order ("complete order") from a TCP client circuit of one client device 230 may reach a port of the time stamp circuit at a different time than TCP segment(s) constituting a complete other order from a TCP client circuit of another client device 230, based on the networks paths interconnecting the respective TCP client circuits with ports of the time stamp circuit having different lengths, for example, optical fiber cables having different lengths. The memory 206 may store time offsets for respective network paths that account for and may be utilized to compensate for different transmission durations respectively for the network paths. The time offsets respectively of the network paths 250 may be stored in the memory to indicate correspondence to predetermined TCP client circuits 210. For example, for a predetermined configuration of the system 200 where the same communication protocol is used at each of the TCP client circuits 210A, 210B and 210C, optical fiber is used as the medium of the network paths 250A, 250B and 250C and different lengths of optical fiber as the network paths 250A, 250B and 250C extend from the TCP client circuits 210A, 210B and 210C to respective ports 213A, 213B and 213C of the time stamp circuit 212, the network paths 250A, 250B and 250C may be determined to have optical fiber lengths of 3 meters, 8 meters and 10 meters, such that time offsets Offset-A, Offset-B and Offset-C for the network paths 250A, 250B and 250C may be 10 ns, 26.7 ns and 33.3 ns, respectively. The time offsets may compensate for the differences in the transmission durations, to advantageously provide that orders may be distributed chronologically to one or more destinations based on a time the order is completely transmitted from a TCP client circuit. In one embodiment, a length of an optical fiber cable extending from a TCP client circuit to the time stamp circuit 212 may be measured by electronic, optical or manual techniques, for example, by a tape measure, and the time offset for the TCP client circuit may be determined based on the measured length of an optical fiber cable extending from the TCP client circuit to the time stamp circuit 212.

In one embodiment, the TCP client circuits 210 may be configured to transmit a TCP stream of data packets representative of a data item to the time stamp circuit 212 over a network path 250. For example, the TCP client circuit 210A may transmit one or more TCP segments including all details of an order over a predetermined network path 250A to a predetermined port 213A of the time stamp circuit 212 designated to receive data from the TCP client circuit 210A.

In one embodiment, the time stamp circuit 212 may be configured as an FPGA including a plurality of physical ports 213 coupled with respective network paths 250. The time stamp circuit 212 may be configured to determine a time stamp for a data item from a TCP client circuit 210 based on a time when all the data for the data item, for example, an order, is received at a port of the time stamp circuit. In one embodiment, the order may be received at the time stamp circuit 212 as a message formed by a TCP stream of data packets, and a time stamp for the order may be based on a time of receipt of a data packet of the stream of data packets containing a last data byte of the order.

In one embodiment, the time stamp circuit 212 or the controller 202 may include and control an electronic clock as a local clock of the system 200 whose time value is used to assign a time of receipt to all bits of data received at a port of a time stamp circuit, and determine a time stamp for an order based on the times of receipt of respective bytes of an order session message from a TCP client circuit. In one embodiment, the controller 202 may synchronize time stamps determined for orders received by a plurality of time stamp circuits in the system, to a time value of an electronic clock configured at and controlled by the controller or one of a plurality of time stamp circuits in a computing system, such as in the system 100 of the FIG. 2.

The memory 206 may include a lookup table that indicates correspondence between a time offset, a TCP client circuit, a network path, and a port of a time stamp circuit. For example, the memory 206 may indicate a time offset of 9 ns corresponds to the TCP client circuit 210A, the network path 250A and the port 213A of the time stamp circuit 212.

In one embodiment, the time stamp circuit 212 may be communicatively coupled with the order entry gateway 214 via a communication path 280. In this embodiment, the time stamp circuit 212 or controller 202 may, based on the port of the time stamp circuit at which data for a particular order is received, determine from the memory 206 a time offset corresponding to the particular order. The time stamp circuit 212 may generate an order message including all data of the order, and also the time stamp and the time offset for the order and transmit the order message over the communication path 280 to the order entry gateway 214.

In one embodiment, the time stamp circuit 212 may include a plurality of ports 217A, 217B . . . 217N, and a plurality of communication paths 290A, 290B . . . 290N may communicatively couple the ports 217A, 217B . . . 217N with a plurality of ports 215A, 215B . . . 215N of the order entry gateway 214. In one embodiment, the order entry gateway 214 may be configured to include at least one processor and a memory. In one embodiment, the communication paths 290 may be, for example, an integrated circuit chip bus or the like. The time stamp circuit 212 may be configured to include predetermined internal data paths that extend therethrough from the ports 213A, 213B . . . 213N respectively to the ports 217A, 217B, . . . 217N. In this embodiment, the time stamp circuit 212 may generate at least one order message including all data of an order, and the time stamp determined for the order, and transmit to the order entry gateway 214 the at least one order message via a port 217 corresponding to the port 213 at which the TCP segment(s) containing the details of the order were received.

In one embodiment, the computing system 200 may be configured to operate in a time offset calibration mode to determine associations between ports of the order entry gateway 214 and TCP client circuits. The calibration mode may be performed when a user establishes a connection, such as logs into the system 200, at a client device. In the calibration mode, the controller 202 may cause a calibration signal, such as specific encoded message, to be generated by a signal generator of a specific TCP client circuit associated with the client device of the user and transmitted from the specific TCP client circuit over a network path 250 extending therefrom to a specific port 213. In one embodiment, the ports 213 may constitute physical switch ports of a programmable hardware device, such as an FPGA. The calibration signal may be routed from the specific port 213, along a predetermined internal data path through the time stamp circuit 212, such as logic gates of an FPGA, to a specific port 217 coupled over a predetermined network path 290 to a specific port 215 of the order entry gateway 214. In one embodiment, the calibration signal may be generated at a TCP client circuit or the time stamp circuit 212. The order entry gateway 214 may determine an identity of the specific port 215 at which the calibration signal from the specific TCP client circuit is received, and store in a memory, such as the memory 206, a correspondence between the specific port 215 and the specific TCP client circuit. In one embodiment, the memory 206 may include a lookup table that indicates time offsets for the TCP client circuits that respectively correspond to the ports 215. For example, a calibration signal from TCP client circuit 210A received at the port 213A may be routed through a data path of the time stamp circuit 212 to the port 217A, and then communication path 290A which is coupled to the port 215A. The order entry gateway 214 may determine, from the memory 206, that a time offset for an order of an order message received at the port 215A is the time offset for the TCP client circuit 210A, which is coupled to the port 213A.

The order entry gateway 214 may control, for each order received from the time stamp circuit 212 in one or more order messages, determining an updated time stamp. The updated time stamp is equal to the time offset corresponding to the TCP client circuit from which the order is submitted subtracted from the time stamp determined for the order at the time stamp circuit. In addition, the order entry gateway 214 may control generating an updated order message containing all data for the order and indicating an updated time stamp and route the updated order message to the sequencer 216.

The sequencer 216 may be configured as a processor, or a desirably an FPGA or like programmable hardware device, or a combination of the former and latter. The sequencer 216 may control receiving the updated order messages, chronologically ordering the orders respectively of the updated order messages in a sequencer queue based on the updated time stamps and generating an output stream including the updated order messages of the respective orders in a chronological sequence in accordance with the sequence of the orders in the sequencer queue. In one embodiment, the sequencer 216 may control delaying including an updated order message in the output stream until a hold delay that delays including an updated order message corresponding to an order in the sequencer queue is satisfied. In one embodiment, a hold delay may be dynamically determined to provide that a first order that is completely transmitted from a first TCP client circuit to a time stamp circuit before other orders are completely transmitted from other TCP client circuits to a time stamp circuit and may experience longer transmission durations than the other orders, may be included in the sequencer queue at the same time with the other orders and, therefore, precede in the output stream the other orders from the other TCP client circuits that are completely transmitted after the first order and experience shorter transmission durations to a time stamp circuit of the system 200. The hold delay, thus, may provide for distribution of all orders received from client devices, and fairness in distribution of the orders, to a destination computing device, based on chronological time of transmission of a complete order from a TCP client circuit of a client device.

In one embodiment, the sequencer 216 and or the controller 202 may monitor the sequence of orders represented in the output stream and dynamically increase the hold delay in the event, as described for the above example where it is determined based on the monitoring that the other orders are added to the output stream to precede the first order in a sequencer queue, such that the first order may precede the other orders in the output stream. For example, data processing operations in the system 200 may result in processing delays caused by intermediate non-deterministic processing between the time stamp circuit and the sequencer, such that a time to generate a data item message representative of the data item received at the time stamp circuit and route an updated data item message representative of the data item to the sequencer may increase. This increase in time to generate a data item message and route the corresponding updated data item message hence increases latency in processing of a given order at the system 200, which may impact sequencing of orders added to the output stream such that orders are not ordered based on chronological time of transmission of a complete order from a TCP client circuit of a client device.

In another example, a TCP client circuit may increase the rate at which order session messages are transmitted to a rate greater than the rate at which either the order entry gateway 214 or the sequencer 216 can process respective orders of the order session messages for which time stamps have been determined. In this circumstance, the respective orders may not be processed fast enough to be sequenced at the sequencer, before the hold delay being applied to one or more other orders of respective updated order messages has expired, which would cause the output stream not to include orders as updated order messages in the output stream in chronological sequence reflecting time of complete transmission of an order from a respective TCP client circuit. When this circumstance is determined based on monitoring of orders in the output stream, the controller 202 may increase the hold delay, to ensure that the orders of respective updated order messages are processed for sequencing and are added to the output stream, such that the output stream includes orders in chronological sequence reflecting time of completion of transmission of an order from a respective TCP client circuit In one embodiment, the sequencer 216 and/or the controller 202 may monitor dwelling time of orders at the sequencer 216 before corresponding updated order messages are included in an output stream and, to decrease any unnecessary latency introduced at the sequencer, dynamically decrease the hold delay. In one embodiment, the hold delay may be decreased only so long as orders represented as updated order messages in the output stream are in chronological sequence reflecting actual time of complete transmission of an order from a respective TCP client circuit. For example, an actual time corresponds to a time of the world clock.

The fanout circuit 218 may be configured as a processor, or an FPGA or like programmable hardware device, or a combination of the former and latter. The fanout circuit 218 may receive the output stream of updated order messages from the sequencer 216, and route given updated order messages to one or more TPC server circuits 220 in the order that the given updated order messages are arranged in the output stream. In one embodiment, several TCP server circuits 220 may simultaneously transmit a given order as a respective TCP stream of output data packets including data for the order represented in a given updated order message. The TCP server circuits 220 may, for example, constitute a trading exchange gateway, and transmit the streams of output data packets representative of a respective order over a communication network 260 simultaneously respectively to computing devices 270 serving, for example, as a trading exchange.

In one embodiment, one or more of the client devices 230 may be a laptop, desktop, or mobile computing device, such as a smartphone or tablet. The one or more client devices may execute an "app" to interact with the system 200. The app, for example, may execute on a mobile device operating system, such as Apple Inc.'s iOS®, Google Inc.'s Android®, or Microsoft Inc.'s Windows 10 Mobile®, which provides a platform that allows the app to communicate with particular hardware and software components of the mobile device. For example, the mobile device operating system may provide functionalities for interacting with location services circuitry, wired and wireless network interfaces, user contacts, and other applications, where the functionalities include application programming interfaces (APIs) that enable communication with hardware and software modules executing outside of the app, such as included in the system 200. In one embodiment, the client device 230 may, via the app executing on the client device 230, be configured to communicate with the system 200 via one or more ports of a time stamp circuit 212 or the communication interface 208.

In one embodiment, one or more of the computing devices 270 may be, for example, a financial venue or exchange, a matching engine, a financial trading clearinghouse, a credit check facility, and financial trading compliance office.

In one embodiment, a communication path between the TCP client circuit and a port of the time stamp circuit 212 may be configured to facilitate communication using a Point to Point Financial Information eXchange (FIX) protocol, a binary order entry protocol or any other protocol.

Example Methods

For purposes of illustrating the features of the present disclosure, high level block diagrams of exemplary processes 300, 400 and 500, as shown respectively in FIGS. 4, 5A, 5B and 6, which advantageously arrange data items, such as orders, from clients in chronological sequence based on time of completion of transmission of the data item at a client device, and provide for distribution of the data items to one or multiple destinations in accordance with the chronological sequence, with low latency and to provide for fairness in distribution of the data items based on time of completion of transmission of a data item, are described below in connection with operations performed at components of the exemplary system 200 as shown in FIG. 3. In an exemplary embodiment of the system 200 where the data items are trading orders for financial assets, the process 300 may control: receiving streams of data packets representative of orders from respective client devices as TCP segments; determining, for each order, an updated time stamp based on a time stamp corresponding to a time, as indicated by a local electronic clock of the system 200, that all data of an order is completely received at the time stamp circuit and a time offset corresponding to a client device that is a source of the TCP segment(s) containing the order; generating updated order messages representative of the orders and indicating the updated time stamps; generating an output stream of the updated order messages based on the updated time stamps respectively and applying a hold delay, to provide for fairness of distribution of all orders received chronologically based on time of complete transmission thereof from the client devices; and distributing the orders according to the sequence of updated order messages in the output stream to one or more destinations, desirably simultaneously to multiple destinations when distribution to the multiple destinations is desired for a given order. The process 400 may control receiving, at a sequencer, updated order messages with updated time stamps, which are determined based on time of receipt of all data of an order at a port of a time stamp circuit and the time offset respectively corresponding to the source of the order represented by the updated order message; ordering orders respectively represented in the updated order messages chronologically in a time stamp (first) queue based on the updated time stamps; ordering the orders indicated in the time stamp queue in a sequencer (second) queue based on time of receipt respectively of the updated order messages at the sequencer; holding given orders indicated in the sequencer queue for a hold delay, where, for a given order indicated in the time stamp queue having the earliest updated time stamp and also indicated in the sequencer queue, the given order may be held until the hold delay elapses for the given order; when the hold delay for the given order elapses, inserting into an output stream the updated order message corresponding to the given order and other updated order messages for any other orders respectively indicated in the time stamp queue having an updated time stamp earlier than the updated time stamp of the given order. The process 500 may control monitoring orders represented in the output stream as updated order messages and adjusting the hold delay used in the process 400 based on determining whether all the orders received are represented in the output stream in a chronological sequence based on the updated time stamp corresponding thereto.

Figure 4:
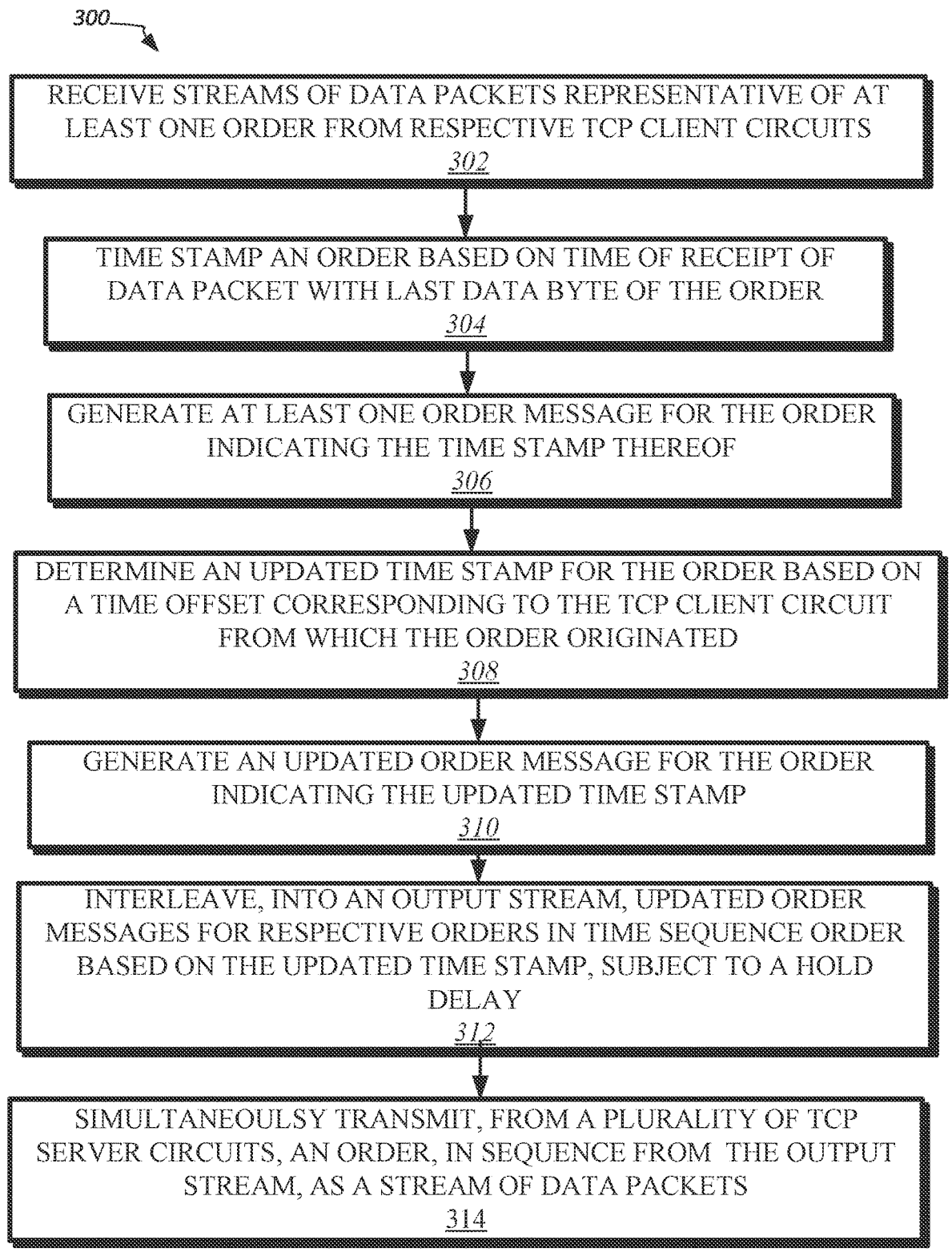
FIG. 4 illustrates an exemplary high level flow diagram of an exemplary method of sequencing data items from multiple computing devices, according to the present disclosure.

Referring to FIG. 4, in block 302, a client device 230 associated with a TCP client circuit 210 may be operated by a user to enter an order for an asset including details such as price, quantity, orientation (buy or sell), and identifier of the asset, etc. Based on entry of the order, the client device 230 may establish an order session for the order with the system 200 to facilitate transmission of details of the order over a predetermined network path 250 to a time stamp circuit 212, and distribution, from an order entry gateway 214 which is coupled to the time stamp circuit 212, of the order to one or more destinations, such as computing devices 270 of respective trading exchanges. In one embodiment, the TCP client circuits 210 and TCP server circuits 220 may use a same Internet Protocol configuration for all order sessions. In one embodiment, one or more of the client devices 230 may be operated by one or more users of an entity, such as a brokerage firm, to establish a plurality of order sessions with the system 200, where orders respectively of the order sessions are transmitted serially or in parallel from a TCP client circuit associated with the one or more client devices over a same predetermined network path 250 to a time stamp circuit of the system 200.

In one embodiment, the TCP client circuit 210 may generate one or more TCP segments formed from a plurality of TCP data packets representative of an order and transmit a stream of TCP data packets representative of the order over a predetermined network path 250 that communicatively couples the TCP client circuit 210 with a port 213 of a time stamp circuit 212. For example, based on entry of a first order at the computing device 230A, TCP client circuit 210A may generate data packets representative of the first order and transmit the data packets as a TCP stream of the data packets in one or more TCP segments over the network path 250A, which terminates at port 213A of time stamp circuit 212. Similarly, others of the TCP client circuits 210 may transmit respective TCP streams of data packets representative of other orders in one or more TCP segments. An order may be completely transmitted to the system 200 by a TCP client circuit when a data packet containing a last data byte needed to complete the transmission of all information of the order is transmitted from the TCP client circuit. The time at which the data packet containing the last data byte of the order is transmitted from the TCP client circuit is referred to herein as completion of transmission of the order. The completion of transmission of orders at different TPC client circuits may be at different times, and in some cases may be at a same time. The data packets of a TCP stream of data packets for a given order may include information identifying the client device 230 at which the given order is entered, the TCP client circuit 210 from which the TCP segment(s) representative of the given order is transmitted, and a user of the client device 230 that entered the given order. Each data packet associated with a given order may include an identifier of the given order, for example, in a header of the data packet or the TCP segment containing the data packet, and an indication whether the data packet is the last data packet associated with a given order transmitted in a TCP stream of data packets from a TCP client circuit that results in completion of transmission of the order.

Further in block 302, a time stamp circuit 212 may receive, over a network path 250, a stream of data packets representative of an order. Continuing with the above example of the first order, the TCP stream of data packets representative of the first order may be received at the port 213A of the time stamp circuit 212. Referring to FIG. 2, it is to be understood that the system 200 according to the present disclosure may, similarly as shown for the system 100, include a plurality of time stamp circuits 212 having respective ports thereof coupled to predetermined network paths 250 that extend from TCP client circuits 210 that are configured to generate and transmit respective orders as TCP streams of data packets in TCP segments. In one embodiment, the time stamp circuit 212, and desirably any additional time stamp circuit in the system 200, may be a programmable integrated circuit including a programmable hardware device, such as an FPGA.

In one embodiment, the time stamp circuit 212 may be configured to read and extract data packets representative of an order from a TCP segment, and other data associated with TCP message transmission such as error correction data and store the data and the data packets in a memory. In one embodiment, the time stamp circuit 212 may, for each given order of a given order session established between a client device and the system 200, include a buffer or other memory configured to store data packets of the given order. Advantageously, the buffer may avoid data packet transmission of a first order session, for which data packets are still being received from a TCP client circuit, from blocking receipt of all data packets of another order session that constitute completion of transmission of another order and processing the another order session in accordance with the present disclosure. The time stamp circuit 212 may save a partially complete order, in other words, an order of an order session for which all data packets that would constitute completion of transmission of the order have not been transmitted, in the buffer, while the remainder of data packets for the order session continue to be received at the time stamp circuit. In one embodiment, a size of a buffer may be determined based on a maximum size of an order message representative of an order that may be transmitted to a destination computing platform, such as a trading exchange, according to predetermined parameters on order message receipt.

In one embodiment, the time stamp circuit 212, alone or combination with the processor 204, may, for example, from a message field length field in a TCP segment, determine a size of data forming the data packets of an order from the TCP client circuit. The size may be determined without fully decoding or modifying content of data packets of a TCP segment. The time stamp circuit 212, alone or combination with the processor 204, may discard any data packets of an order where the data size of the order is determined to exceed a maximum size for an order message. This advantageously may ensure reliability of the system 200, such that only those orders that may be delivered to a trading exchange, according to trading exchange order message size specifications, are accepted at the system 200.

Further in block 302, in one embodiment, the time stamp circuit 212 may operate and maintain an electronic clock as a local clock of the system 200 that electronically times at increments of nanoseconds. In one embodiment, the time stamp circuit 212 may, for each bit or byte of data received in a data packet at a port 213 thereof, associate a time of receipt at the port 213 with a time indicated by the electronic clock at the time of receipt. The time stamp circuit 212 may store in a memory, for each bit or byte of data, the time of receipt of each bit or byte of data correlated with information identifying the order corresponding thereto.

In block 304, the time stamp circuit 212 may, from information in the headers of respective data packets of an order session, determine a data packet that contains a last data byte transmitted for the order session; determine, from the memory, a time stamp based on a time of receipt of the data packet containing the last data byte for the order of the order session; and associate the time stamp with the order of the order session. In one embodiment, the memory 206 may include a lookup table in which the controller 202 or the time stamp circuit 212 stores identifiers of order sessions correlated with respective time stamps determined therefor by the time stamp circuit.

In one embodiment, the controller 202 may control determining time stamps respectively for orders of order sessions received at multiple time stamp circuits, such that the times of the time stamps are synchronized with the time of an electronic clock that acts as a local clock for the system 200. Advantageously, the technical problem of chronologically ordering order sessions from multiple client devices based on respective times of completion of transmission of the orders is solved by the technical solution of the present disclosure that (i) determines a time stamp for an order represented in an order session based on a time, as indicated on a local electronic clock, at which all of the data packets of the order have been received at a time stamp circuit, and independently of a format of an order message, such as formatting of the payload corresponding to the details of an order in a TCP segment(s); and (ii) based on the time stamp and a time offset corresponding to the respective network path on which the data packets of the order of the order session is provided, chronologically orders the orders for distribution in accordance with times of completion of transmission of the orders at the respective client devices.

The time stamp determined for an order represented in an order session message may account for serialization latency of a last byte of an order session message. Advantageously, the technical solution of accounting for serialization latency associated with the transmission of TCP segments as order session messages from a TCP client circuit may ensure that, regardless of the format of payload of an order in TCP data packets, the time stamp determined for an order provides for fairness to respective clients, as the time stamp corresponds to completion of transmission of an order at a client device via a TCP client circuit.

Figure 7A:
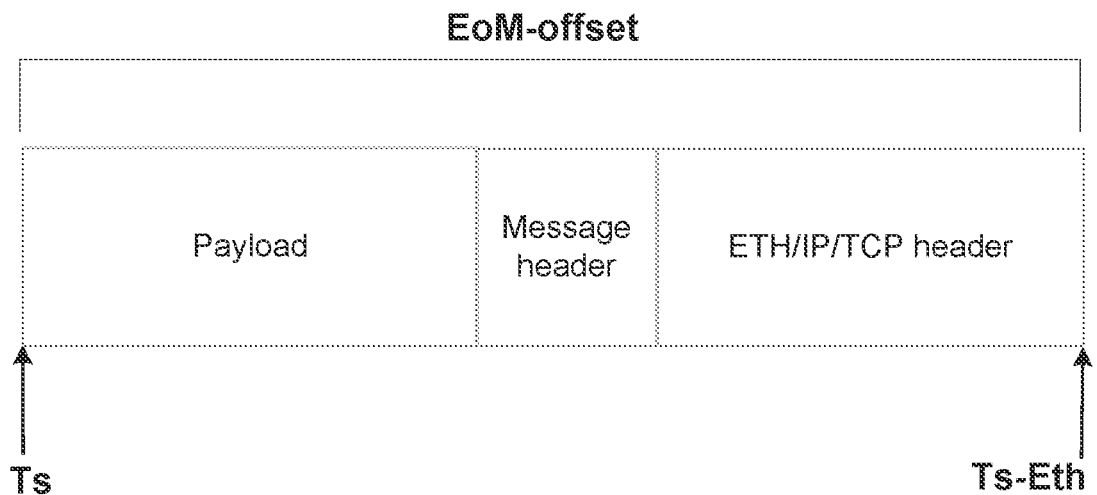
FIGS. 7A, 7B and 7C illustrate exemplary Transport Control Protocol (TCP) segments for transmission of a data item, according to the present disclosure.

In one embodiment, referring to FIG. 7A, an order may include a plurality of data packets that constitute the entirety of the data of the order and are contained as payload of an order session message transmitted in a single TCP segment from a TCP client circuit 210. The TCP segment may contain the payload and a message header for the order session message, and an Ethernet header (ETH/IP/TCP header). For the TCP segment, Ts-Eth is time of reception of the first bit of the Ethernet header, and EoM-offset is equal to the number of bytes between the first byte of the Ethernet header and the last byte of the order session message. The time stamp Ts determined for the order session message, i.e., the order represented in the order session message, may be Ts=Ts-Eth+EoM-offset*ByteRead, where ByteRead is a rate at which a processor, such as the processor 204 or a processor at a time stamp circuit 212, reads one byte of data received, such as in a TCP segment, at a port 213 of a time stamp circuit 212. In one embodiment, ByteRead is 0.8 ns/byte.

Figure 7B:
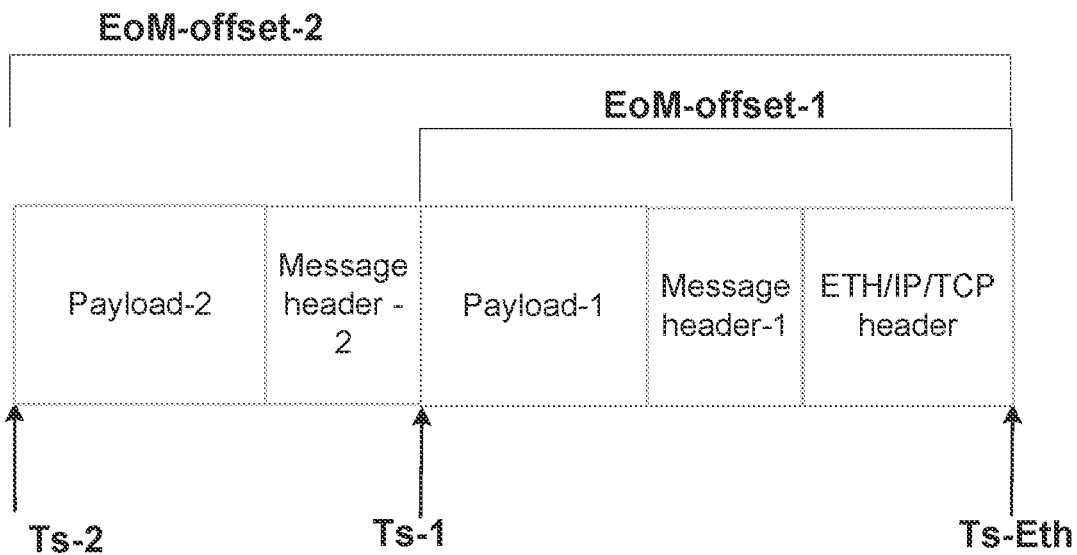

In one embodiment, referring to FIG. 7B, a single TCP segment transmitted from a TCP client circuit 210 may include several complete orders of respective order session messages. The TCP segment may contain an Ethernet header, a first message header (Message header-1) and payload (Payload-1) for a first order session message, and a second message header (Message header-2) and payload (Payload-2) for a second order session message. For the TCP segment, Ts-Eth is time of reception of the first bit of the Ethernet header, EoM-offset-1 is equal to the number of bytes between the first byte of the Ethernet header and the last byte of the first order session message, and EoM-offset-2 is equal to the number of bytes between the first byte of the Ethernet header and the last byte of the second order session message. The time stamp Ts-1 determined for the first order session message, i.e., the first order represented in the first order session message, may be Ts-1=Ts-Eth+EoM-offset-1\*ByteRead. The time stamp Ts-2 determined for the second order session message, i.e., the second order represented in the second order session message, may be Ts-2=Ts-Eth+EoM-offset-2\*ByteRead.

Figure 7C:
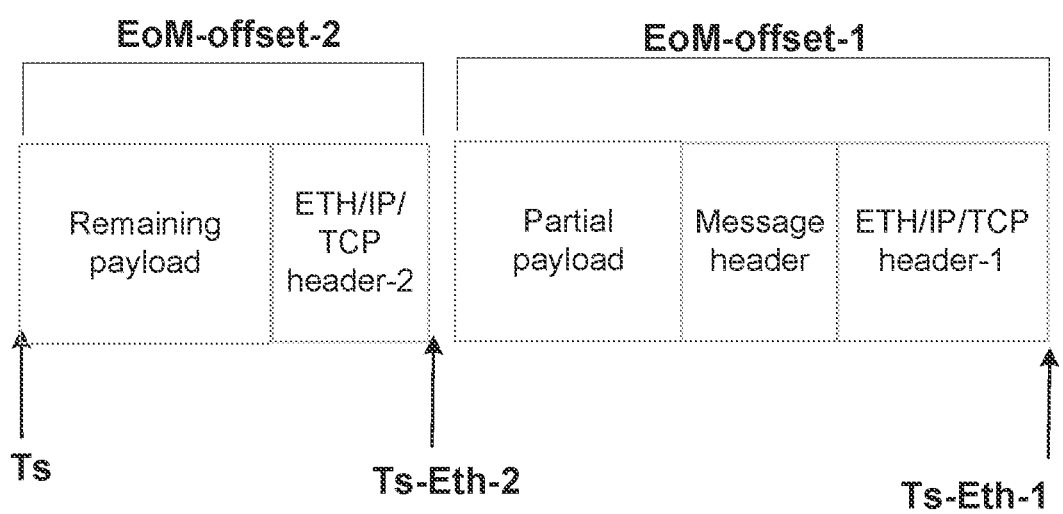

In one embodiment, referring to FIG. 7C, an order of an order session message may be transmitted from a TCP client circuit 210 across several TCP segments. A first TCP segment may contain an Ethernet header-1, and a message header and partial payload for the order session message, and a second TCP segment may contain an Ethernet header-2 and a remaining payload for the order session message. The remaining payload may contain the data packet that is a last data packet in the second TCP segment and includes a last data byte transmitted for the order of the order session message. For the TCP segments, Ts-Eth-1 is time of reception of the first bit of the Ethernet header-1 of the first TCP segment, EoM-offset-1 is equal to the number of bytes between the first byte of the Ethernet header-1 and the last byte of the partial payload in the first TCP segment, EoM-offset-2 is equal to the number of bytes between the first byte of the Ethernet header-2 and the last byte of the order session message in the second TCP segment, and Ts-Eth-2 is time of reception of the first bit of the Ethernet header-2 of the second TCP segment. The time stamp Ts determined for the order session may be Ts=Ts-Eth-2+EoM-offset-2\*ByteRead.

Referring again to FIG. 4, in block 306, the time stamp circuit 212 may generate an order message for the order indicating a time stamp determined for the order in block 304. In one embodiment, the time stamp circuit 212 may determine that data packets identified with a particular order identification number are received at a particular port 213 and, when a last data byte of an order having the order identification number has been received, generate an order message containing all data packets of the order and indicating a time stamp determined for the order based on a time of receipt of the last data packet for the order. In addition, the time stamp circuit 212 may obtain from memory 206, a time offset for the order based on the port 213 of the time stamp circuit 212 at which the data packets identified with the particular order identification number are received, and indicate the time offset in the order message, such as in a header or the payload. The time stamp circuit 212 may generate and transmit at least one order message including all data packets of the order, the time stamp and the time offset over the communication path 280 to the order entry gateway 214.

In one embodiment, the time stamp circuit 212 may include predetermined data paths extending therethrough from the ports 213A, 213B . . . 213N to the ports 217A, 217B . . . 217N, and the communication paths 290A, 290B . . . 290N may communicatively couple the ports 217A, 217B . . . 217N of the time stamp circuit 212 with the ports 215A, 215B . . . 215N of the order entry gateway 214. As described above, the system 200 may be configured to operate in a time offset calibration mode, and store in the memory 206 a table or the like indicating correspondence between time offsets and orders for which data packets are received at respective ports 213 which are transmitted from TCP client circuits. In this embodiment, the time stamp circuit 212 may generate an order message for the order indicating a time stamp determined for the order and transmit the order message from the port 217 corresponding to the port 213 at which the data packets forming the order of the order session message is received at the time stamp circuit 212.

In one embodiment, the time stamp circuit 212 may generate, for a given order, a first given order message indicating a time stamp for the given order, and a second given order message indicating all data for the given order and transmit the first given order message and immediately thereafter the second given order message.

In one embodiment, the controller 202 may determine that an order session switches from an open state, in which order data may be transmitted from a TCP client circuit to a time stamp circuit, to a closed state, in which order data is prevented from being transmitted from a TCP client circuit to a time stamp circuit, while data for the order of the order session in one or more TCP segments received by the system 200 is being processed in the system 200, such as by the time stamp circuit 212. An open state for an order session occurs when the order session is established, and a closed state for the order session may occur, for example, when the system 200 experiences a failure or has insufficient processing or storage capacity to receive and process additional order data, as described in detail below. In response to switching from the open state to the closed state, the controller 202 may automatically delete from memory any data of the order already received, thereby reducing use of memory resources of the system 200. When the order session switches from the closed state to the open state, as determined by the controller 202, the controller 202 may exchange retransmission information messages with a client device 230, to provide for retransmission of the entirety of the data of the order of the order session from the client device 230.

In one embodiment, the controller 202 or a processor at a time stamp circuit 212 may manage error checking and error correction of order messages received from a TCP client circuit 210, based on the data extracted from a TCP segment. In one embodiment, the controller 202 may, for data packets including payload as order details of an order for which the controller 202 determines the TCP segments from the TCP client circuit satisfy error correction processing based on a TCP checksum included in the TCP segments, recompute a TCP checksum or frame check sequence (FCS) for an Ethernet header of a TCP segment to be used for transmitting an order from a TCP server circuit. In one embodiment, the controller 202 may discard any TCP segment that is determined to be corrupted, based on a failure of error correction verification. The controller 202, thus, may hold any further processing of order data of an order session from being forwarded to the order entry gateway 214, until the FCS for all TCP segments of the order has been verified. A time stamp may be determined for the order only when the entirety of the order information has been received at the time stamp circuit, following retransmission of TCP data packets from a TCP client circuit to the time stamp circuit. Although holding the order data until the FCS for each TCP segment has been verified may increase latency, the advantageous fairness and accuracy of distribution of orders of order messages chronologically based on time of completion of transmission is not impacted based on the time stamping and hold delay functionalities according to the present disclosure, as described in detail below.

In block 308, the order entry gateway 214 may receive from the time stamp circuit at least one order message corresponding to an order entered at a client device. In one embodiment, the order entry gateway 214 may determine an updated time stamp of the order, based on the time stamp and a time offset corresponding to the TCP client circuit from which the order originated. In one embodiment, the order entry gateway 214 may obtain the time stamp for the order from an order message for the order received from the time stamp circuit, obtain a time offset for the order indicated in the memory 206 as corresponding to the order or the TCP client circuit from which the order was transmitted, and subtract the time offset for the order from the time stamp to obtain an updated time stamp. For example, continuing with the example, for the first order, the time stamp may be 90.050 microseconds and the time offset may be 0.010 microseconds, such that the updated time stamp for the first order is 90.040 microseconds; for a second order from a TCP client circuit 210B, the time stamp may be 90.040 microseconds and the time offset may be 0.027 microseconds, such that the updated time stamp for the second order is 90.013 microseconds; and for a third order from a TCP client circuit 210C, the time stamp may be 90.030 microseconds and the time offset may be 0.033 microseconds, such that the updated time stamp for the third order is 89.997. In this example, the network paths 250A, 250B and 250C extending respectively from the TCP client circuit 210A, 210B and 210C are in increasing order of length, such that the signal transmission durations from the TCP client circuits 210B and 210C to the time stamp circuit are longer than the signal transmission duration from the TCP client circuit 210A to the time stamp circuit. The time offsets compensate for the different network path lengths, and thus transmission durations, to provide that signal transmission durations respectively over the network paths are accounted for when orders are received and placed in a chronological sequence to provide distribution in correspondence to chronological ordering based on time of completion of transmission of an order respectively at the TCP client circuits 210A, 210B and 210C.

In block 310, the order entry gateway 214 may generate an updated order message indicating the order details and the updated time stamp for the order. Also in block 310, the order entry gateway 214 may transmit updated order messages to the sequencer 216 as updated order messages are generated.

In one embodiment, the controller 202 or a processor at the order entry gateway 214 may determine, while an order session is open with a client device, whether an amount of data of order sessions transmitted from the client device over a predetermined network path 250 and received at the order entry gateway 214 exceeds the processing or data storage capacity of the system 200, such as at the order entry gateway 214, allocated to a client for which order sessions are established over the predetermined network path. When the controller 202 or the processor at the order entry gateway 214 determines the processing or data storage capacity corresponding to the predetermined network path is or is about to be exceeded, the controller 202 may control operation in a session throttling mode for the client for which order session data is transmitted over the predetermined network path. When a session throttling mode is initiated, the controller 202 may control communicating a throttling message to the client device 230 indicating that no further data for an order session may be transmitted from a TCP client circuit and control the TCP client circuit associated with the client device to prevent transmission of additional order data therefrom over the predetermined network path 250. Advantageously, the operation in the session throttling mode in association with a predetermined network path 250 may prevent one order session from a first client from adversely impacting other order sessions from the first client over the same predetermined network path, in that other order sessions may not be established from the first client until the system 200 has the capacity to receive and process data from those other order sessions from the first client.

In one embodiment, the controller 202, when a session throttling mode is initiated, may communicate a throttling message to the client device associated with the predetermined network path, to decrease the number of new order sessions, or prevent any new order session, from being opened at the client device and, thus avoid the network path from the client device to the system 200 from becoming inoperable. In one embodiment, the session throttling mode does not implement a granular throttling of a specific order session, and instead the throttling message indicates either a zero or maximum data path size. The TCP client circuit associated with the client device, in turn, may be controlled to completely prevent transmission of an order session of any size, or permit transmission of one or more order sessions collectively having a data size less than or equal to a maximum data size. In one embodiment, the maximum size may be configurable in real time according to storage capacity and processing resource availability in the system 200, such as at the controller 202, as monitored by the controller 202 in real time.

The throttling of an order session advantageously avoids the need for the system 200 to allocate or include a large memory storage capacity for a specific client device. In one embodiment, when a session throttling mode is initiated after the processing and data capacity of the system 200 associated with a predetermined network path is exceeded, the controller 202 may discard any data of an order session received. In one embodiment, when a session throttling mode is initiated, the controller 202 may close an order session that is currently open, which prevents additional data for the currently open order session from being transmitted from a client device to the system 200.

In block 312, the sequencer 216 may receive the updated order messages from the order entry gateway 214. In one embodiment, the sequencer 216 may include and control an electronic sequencer clock indicating time at increments of nanoseconds. The sequencer 216 may, for each updated order message received, assign a sequencer time stamp to the order of the updated order message that is a time indicated by the electronic sequencer clock at the time of receipt of the updated order message at the sequencer. In one embodiment, the sequencer 216 may delay including in an output stream an updated order message received at the sequencer 216 for a period equal to a hold delay, to provide that all orders received may be distributed to destination computing devices in chronological order based on the times of completion of transmissions respectively from TCP client circuits, as indicated by the updated time stamps respectively for the orders. The hold delay may be determined to compensate for differences in network properties and processing operations associated with conveying and processing order data from TCP client circuits in the system 200, to ensure fairness of distribution of all orders received chronologically based on times of completion of transmission of the orders from respective TCP client circuits. The sequencer 216 may generate an output stream including the updated order messages in chronological sequence, where individual updated order messages are inserted into the output stream based on application of the hold delay to one or more the updated order messages.

Figure 5A:
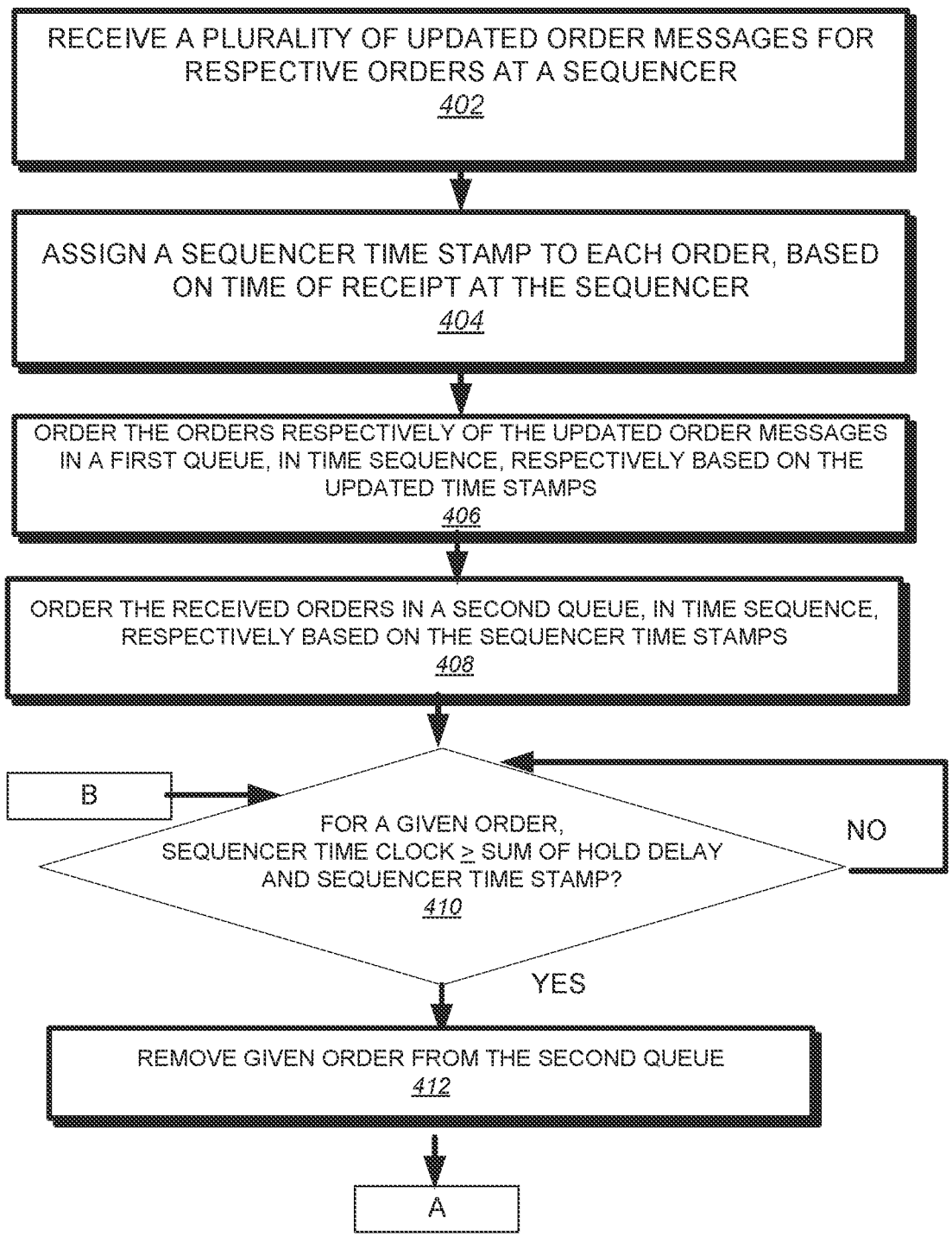
FIGS. 5A and 5B illustrate an exemplary high level flow diagram of an exemplary method for generating an output stream, according to the present disclosure.
Figure 5B:
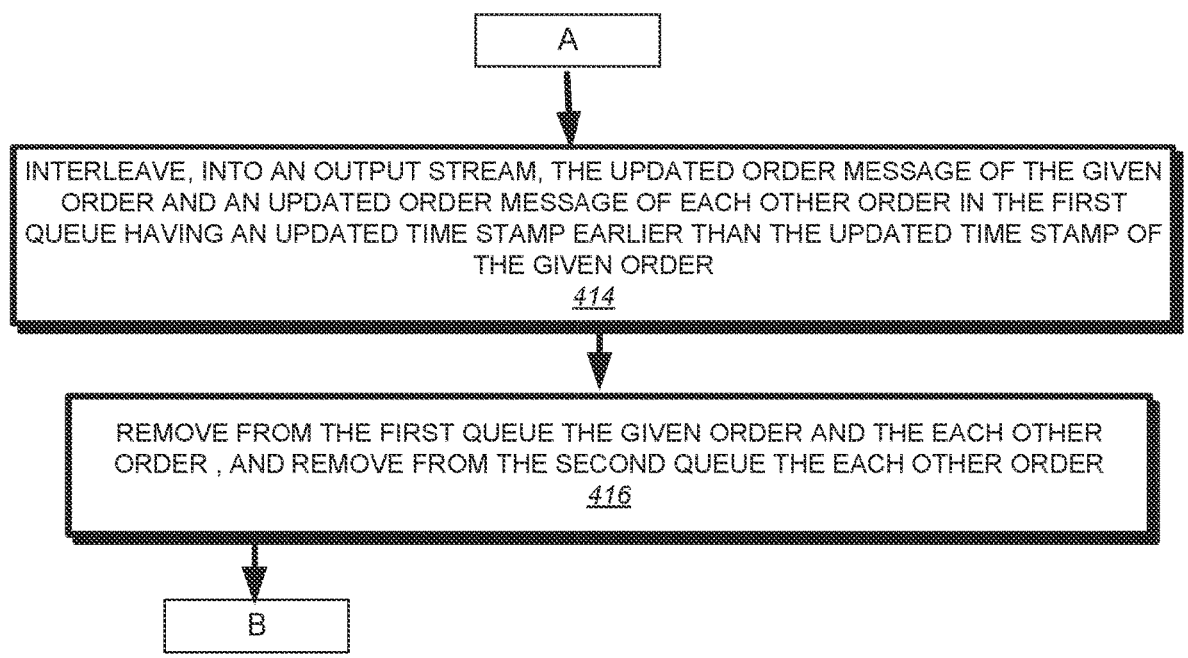

Referring to FIGS. 5A and 5B, in one embodiment, the sequencer 216 may perform one or more functions of block 312 by performing a process 400 that generates an output stream of updated order messages in chronological sequence based on the updated time stamp, with application of the hold delay.

In block 402, the sequencer 216 may receive a plurality of updated order messages for respective orders from the order entry gateway 214, and store the updated order messages in a memory, such as the memory 206.

In block 404, the sequencer 216 may assign a sequencer time stamp to each order represented in an updated order message, where the sequencer time stamp is a time indicated by a time of the sequencer clock when the updated order message is received at the sequencer 216. The sequencer 216 may store in the memory the sequencer time stamp assigned to the order of the updated order message.

In block 406, the sequencer 216 may manage a first queue in its memory that indicates orders of updated order messages identified by order identification number and lists the orders in chronological order based on the respective updated time stamps.

In block 408, the sequencer 216 may manage a second queue in its memory that indicates orders of updated order messages identified by order identification number and lists the orders in chronological order based on the respective sequencer time stamps. For ease of reference, reference is made below to orders being in a queue, although the queue includes indications of the orders, instead of the orders themselves.

In an initial state, the second queue is empty, in other words, does not indicate any orders, such as when operation of the system 200 is initially commenced. In addition, the second queue may be empty at a time during operation of the system 200.

In an example operation of the system 200, fourth, fifth and sixth orders of respective updated order messages have updated time stamps of 90.059, 90.055 and 90.050 microseconds and sequencer time stamps of 100.040, 100.045 and 100.049 microseconds. The sequencer 216 may add an indication of the orders in the second queue as the orders are received as indicated by the sequencer time stamp, where the fourth order is indicated first in the second queue, the fifth order is indicated in the second queue immediately following the fourth order, and the sixth is indicated in the second queue immediately following the fifth order, such that the sequence in the second queue, from earliest received at the sequencer, is fourth order, fifth order and sixth order. In the example, at the time the updated order message of the fourth order is received at the sequencer 216, the second queue does not contain any other orders and no other updated order messages of other messages are received before the updated order message of the fourth order. In addition, the sequencer 216 may add the fourth, fifth and sixth orders to the first queue, according to the chronology of earliest updated time stamp, such that the sixth order is indicated first in the first queue, the fifth order is indicated in the first queue immediately following the sixth order, and the fourth order is indicated in the first queue immediately following the fifth order, such that the sequence in the first queue, according to the earliest updated time stamp, in other words, earliest completion of transmission of an order, is sixth order, fifth order and fourth order.

In block 410, the sequencer 216 may continuously monitor time indicated on the sequencer time clock and compare the sequencer time clock time with a sum of a hold delay and sequencer time stamp for a given order in the second queue having the earliest sequencer time stamp.

When the sequencer time clock time is equal to or exceeds a sum of the hold delay and the sequencer time stamp for the given order having the earliest sequencer time stamp in the second queue, the sequencer 216 in block 412 may remove the given order from the second queue.

In block 414, the sequencer 216 may insert into an output stream, in chronological order based on the respective updated time stamp, an updated order message corresponding to the given order removed from the second queue in block 412, and an updated order message corresponding to each other order in the first queue, if any, having an earlier updated time stamp than the given order. Continuing with the above example, when the sequencer 216 determines that the fourth order, as the earliest order in the second queue, has been in the second queue for equal to or greater than the hold delay (timed from the sequencer time stamp of the fourth order), the sequencer 216 may determine that the fifth and sixth orders are in the first queue and have earlier updated time stamps than the fourth order, and insert the sixth, fifth and fourth orders into the output stream in chronological order of the sixth, fifth and fourth orders in accordance with the updated time stamps respectively.

In block 416, the sequencer 216 may remove from the first queue the orders added to the output stream in block 414, when the respective updated order messages are added to the output stream. In addition, the sequencer 216 may remove from the second queue the orders added to the output stream in block 414, when the respective updated order messages are added to the output stream. For example, continuing with the example, the fourth, fifth and sixth orders are removed from the first queue as an updated order message corresponding to each order is added to the output stream. In addition, the fourth, fifth and sixth orders are removed from the second queue, as those orders already have been represented in the output stream. In the example, although the fourth order is held at the sequencer for the hold delay of 10 nanoseconds, the fifth and sixth orders are held at the sequencer for less than the hold delay, namely, 5 and 1 nanoseconds, respectively. The sequencer 216 may continuously perform the functions of blocks 410, 412, 414 and 416 to remove orders from the two queues based on application of the hold delay and add updated order messages corresponding to the removed orders to the output stream in chronological order based on the updated time stamps.

In one embodiment, the sequencer 216 may interleave updated order messages into the output stream with other order messages already in an output stream for which sequenced distribution is not provided according to the present disclosure. The interleaving may preserve the chronology of the updated time stamps respectively among the orders on which sequencing according to the present disclosure is performed.

Referring again to FIG. 4, in block 314 the sequencer 216 may route the output stream including the updated order messages inserted in block 312, to the fanout circuit 218. The fanout circuit 218 may fanout an updated order message to one or more of the TCP server circuits 220 once the updated order message is completely received. In one embodiment, for each order represented in the output stream, the fanout circuit 218 may instruct one or more of the TCP server circuits 220 to transmit, over a communication network 260, a TCP stream of data packets representative of the order, to a computing device 270 destination. In one embodiment, the TCP stream of data packets representative of the order in the output stream may be transmitted simultaneously to multiple computing devices 270 from the TCP server circuits. The orders are advantageously distributed to the computing device destination according to the sequence of the orders in the output stream, i.e., on a first-in-first-out (FIFO) basis, thereby advantageously providing for fairness in distribution based on time of completion of transmission of an order at a client device.

Figure 6:
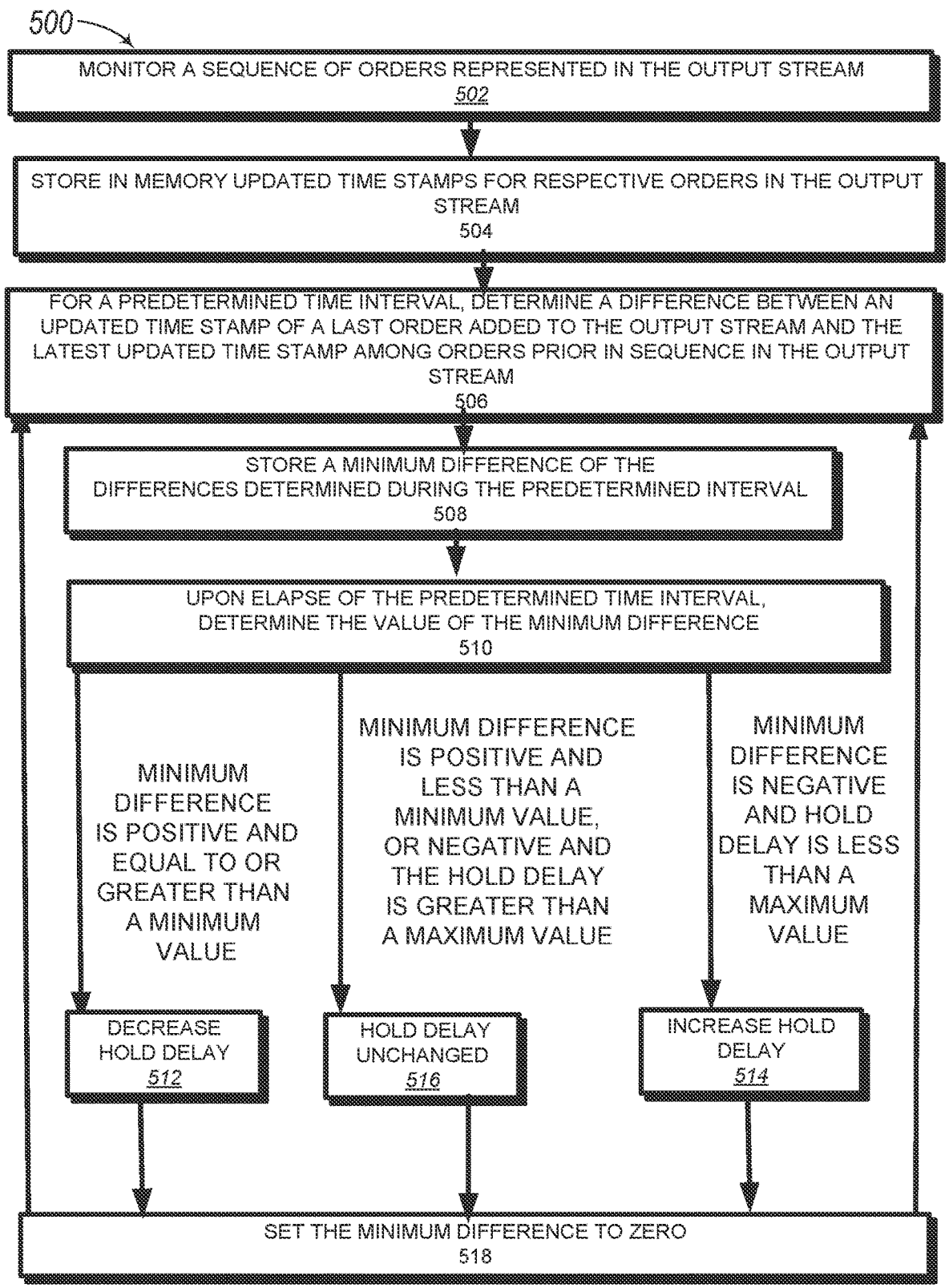
FIG. 6 illustrates an exemplary high level flow diagram of a method of determining a hold delay applied when generating an output stream, according to the present disclosure.

In one embodiment, referring to FIG. 6, the controller 202 or another component of the system 200 may perform a process 500 that monitors and adjusts the hold delay to minimize latency while maintaining fairness in distributing all received orders in chronological order according to time of completion of transmission from a client device, based on the updated time stamp.

Referring to FIG. 6, in block 502 the controller 202 may monitor the updated time stamps respectively of a sequence of orders represented in the output stream. In block 504, for each order represented in the output stream, the controller 202 may store an updated time stamp of the order in a hold delay table in the memory 206. The updated time stamps may be stored in the hold delay table, in a same sequence that orders corresponding thereto are arranged in the output stream.

In block 506, the controller 202 may include and control an electronic hold timer that electronically times a predetermined time interval. The controller 202 may, for each successive order added to the output stream while a predetermined time interval being timed by the electronic hold timer has not elapsed, determine a time difference between the updated time stamp of the order and a latest updated time stamp of the updated time stamp(s) in the hold delay table. If the time difference is positive, i.e., the updated time stamp of the order is after the latest updated time stamp in the hold delay table, then the subject order is properly in sequence in the output stream. If the time difference is negative, i.e., the updated time stamp of the order is before the latest updated time stamp in the hold delay table, then the subject order is not in proper sequence in the output stream.

In block 508, while the predetermined time interval being timed has not elapsed, the controller 202 may determine a minimum difference of the time differences determined in block 506 and store the minimum difference in the memory 208.

In block 510, when the controller 202 determines that the predetermined time interval being timed by the electronic hold timer has elapsed, the controller 202 may determine a value of the minimum difference stored in the memory. In block 512, when the value of the minimum difference is determined to be a positive value greater than or equal to a predetermined minimum value, the controller 202 may decrease the hold delay by the minimum difference. In this circumstance, the controller 202 may determine that orders are being held too long in the sequencer, before being added to the output stream, such that the hold delay is decreased.

In block 514, when the minimum difference is determined to be a negative value and the hold delay is less than a maximum value, the controller 202 may increase the hold delay by the minimum difference. In this circumstance, the controller 202 may determine that orders are not being held long enough in the sequencer, before being added to the output stream, such that the hold delay is increased. In one embodiment, the hold delay may not be increased above a maximum value, to maintain latency to a minimum. For example, in block 514 the hold delay may be increased by less than the minimum difference, such that hold delay is increased to equal to a maximum value.

In block 516, when the value of the minimum difference is determined to be a positive value less than a minimum value, or the minimum difference is determined to be a negative value and the hold delay is greater than a maximum value, the controller 202 may maintain the hold delay at the current value.

In one embodiment, the controller 202 may decrease or increase the hold delay by a percentage of the minimum difference, or a maximum percentage change from a previous hold delay.

Following block 512, block 514 or block 516, in block 518 the controller 202 may set the value of the minimum difference to zero, and the functions of blocks 506, 508 and 510 and then blocks 512, 514 or 516 may be performed to determine a new minimum difference for another predetermined time interval and potentially adjust the hold delay.

In one embodiment, a computing device 270 destination for an order session may be configured to receive and process data of orders at not more than a predetermined consumption rate. The controller 202 may control transmission of output data packets representative of orders at a transmission rate that does not exceed the predetermined consumption rate. In one embodiment, a consumption rate may change at a computing device 270, and the controller 202 may exchange communication messages with the computing device 270 to receive a changed consumption. The TCP server circuit 220 may be operated to adjust a rate at which order messages are transmitted, to accommodate a change to the predetermined consumption rate, and store in a buffer, such as at TCP server circuit 220, data of output order messages in the output stream, to avoid transmission of order data to a computing device 270 at a rate greater than the consumption rate thereof. For a description of controlling a transmission rate (throttling) at a fanout circuit that may be implemented in accordance with the present disclosure, see U.S. application Ser. No. 17/343,042 filed Jun. 9, 2021, incorporated by reference herein.

In one embodiment, the controller 202 may be configured to monitor and store in memory metrics specific to various data paths in the system 200. For example, the controller 202 may determine and store in the memory: a total number of session throttling modes initiated for a specific client device based on data transmission from the client device; a longest time that a session throttling mode was active for a specific client device based on data transmission from the client device; a total number of data packets of respective order sessions for a specific client device processed; a total number of session throttling modes initiated for a specific client device based on lack of storage or processing capacity at a destination computing device, e.g., a matching engine; longest time that a session throttling mode was active for a specific client device based on lack of storage or processing capacity at a destination computing device; number of data packets of TCP segments discarded at the time stamp circuit; number of TCP checksum errors determined; number of times a throttling message indicated zero additional data packets can be transmitted; from a client device; a number of times throttling was implemented at a TCP server circuit to reduce a rate at which order messages are transmitted to a destination computing device, e.g., a matching engine, to accommodate a change to the predetermined consumption rate and avoid transmission of order data to the destination computing device at a rate greater than the consumption rate thereof. The controller 202 may use the metrics to adjust usage of communication network bandwidth or adjust usage or configuration of processing and memory resources in a computing system according to the present disclosure, to improve the operation of the computing system, including conserving bandwidth, processing and memory resources and avoiding undesirable data overflows or bottlenecks that may adversely impact computing operations and functions of the present disclosure.

Additionally, the present technology may also be configured as below.

(1) A system including:
    at least one first programmable integrated circuit communicatively coupled to a plurality of first transmission control protocol (TCP) client circuits, in which each of the first TCP client circuits is configured to receive order data from a market participant, in which the at least one first programmable integrated circuit is configured to:
    receive, from each of the first TCP client circuits, a stream of data packets representative of at least one order; and
    for each order of the at least one order, identify a last data byte (LDB) data packet in the stream of data packets containing:
    an identifier indicating a LDB of a plurality of data bytes forming the order;
    determine a time stamp for the order based on a time indicated by a time stamp clock at a time of receipt of the LDB data packet of the order at the at least one first programmable integrated circuit; and
    generate at least one order message for the order, in which the at least one order message indicates the time stamp for the order;
    at least one processor configured to:
    for each order for which at least one order message is generated:
    determine an updated time stamp based on a time offset associated with a given first TCP client circuit of the first TCP client circuits from which the order is received, in which the time offset corresponds to a network path extending from the given first TCP circuit client to the at least one first programmable integrated circuit, and in which each of the first TCP client circuits has a time offset corresponding to a network path extending respectively from the first TCP client circuit to the at least one first programmable integrated circuit; and
    generate an updated order message indicating the updated time stamp;
    a sequencer of at least one second programmable integrated circuit configured to:
    receive a plurality of updated order messages for the respective orders;
    assign a sequencer time stamp to each of the respective orders corresponding to a
    time indicated by a sequencer clock at a time of receipt of the updated order message corresponding to the respective order at the sequencer;
    in a first queue, order the respective orders in time sequence, starting with an earliest time, based on the updated time stamps;
    in a second queue, order the respective orders in time sequence, starting with an earliest time, based on the sequencer time stamps;
    compare a time of the sequencer clock with the sequencer time stamps of the respective orders in the second queue, when, for a given order in the second queue, the time of the sequencer clock is determined to be same as or after a sum of the sequencer time stamp for the given order and a hold delay;

remove the given order from the second queue;

interleave into an output stream, in time sequence order starting with an earliest time based on a respective updated time stamp, the updated order message of the given order and an updated order message of each other order in the first queue, if any, having an updated time stamp earlier than the updated time stamp of the given order;

remove, from the first queue, the given order and, if in the first queue, the each other order; and remove, from the second queue, the each other order, if in the second queue; and a fanout circuit of the at least one second programmable integrated circuit communicatively coupled to a plurality of TCP server circuits, in which the fanout circuit is configured to:

for each order represented in the output stream, instruct at least two of the TCP server circuits to simultaneously transmit a second stream of output data packets representative of the order represented in the output stream.

(2) The system according to (1), in which a first order of the at least one order is formed by a plurality of first data packets in the stream of data packets.

(3) The system according to (1) or (2), in which a first order of the at least one order is contained entirely within a single data packet of the stream of data packets.

(4) The system according to any one of (1) to (3), in which the single data packet includes a LDB of a sequence of data bytes forming a second order of the at least one order, in which a LDB of the first order is closer to an end of the single data packet than the LDB of the second order, and in which the at least one first programmable integrated circuit is configured to determine, for the single data packet:

a first given time stamp for the first order corresponding to a time of receipt of the single data packet at the at least one first programmable integrated circuit, and a second given time stamp for the second order that is a predetermined time before the first given time stamp, in which a time difference between the first given time stamp and the second given time stamp is a function of a size of data of the second order in the single data packet.

(5) The system according to any one of (1) to (4), in which the at least one first programmable integrated circuit is configured to:

for a first order represented in the stream of data packets, generate a single first order message containing all order data for the first order and indicating a first time stamp corresponding to a time of receipt of a LDB data packet in the stream of data packets containing an identifier indicating a LDB of a sequence of data bytes forming the first order.

(6) The system according to any one of (1) to (5), in which the single first order message indicates a first time offset obtained from a memory and associated with a given first TCP client circuit of the first TCP client circuits from which the first order is received.

(7) The system according to any one of (1) to (6), in which the at least one first programmable integrated circuit is configured to:

for a first order represented in the stream of data packets:

generate a first order message for the first order indicating a first time stamp corresponding to a time of receipt of a LDB first data packet in the stream of data packets containing an identifier indicating a LDB of a sequence of data bytes forming the first order;

generate a second order message for the first order containing data of the first order as a single data packet; and provide the first order message followed by the second order message to an order entry gateway of the system.

(8) The system according to any one of (1) to (7), in which the first order message or the second order message indicates a first time offset obtained from a memory and associated with a given first TCP client circuit of the first TCP client circuits from which the first order is received.

(9) The system according to any one of (1) to (8), in which the at least one first programmable integrated circuit is configured to route the at least one order message to the at least one processor, in which the at least one order message indicates the time offset corresponding to the order of the at least one order message.

(10) The system according to any one of (1) to (9), in which the at least one processor is configured to:

receive, from the at least one first programmable integrated circuit via a plurality of ports, given first order messages for given first orders from the plurality of first TCP client circuits, in which each port corresponds to a given time offset associated with a given first TCP client circuit of the first TCP client circuits; and for each given first order, determine an updated time stamp based on the given time offset of the port at which the respective given first order message is received from the least one first programmable integrated circuit.

(11) The system according to any one of (1) to (10), further comprising:

the plurality of first TCP client circuits; and the plurality of TCP server circuits, in which the fanout circuit is communicatively coupled with the TCP server circuits and configured to:

interleave given updated order messages corresponding respectively to the given orders, into the output stream; and instruct the TCP server circuits to simultaneously transmit each of the given first orders represented in the output stream as a plurality of output data packets to a remote computing device.

(12) The system according to any one of (1) to (11), in which at least one of the at least one first and second programmable integrated circuits is a programmable hardware device including a field programmable gate array (FPGA).

(13) The system according to any one of (1) to (12), in which the at least one processor is configured to:

determine whether to adjust the hold delay based on monitoring a difference between a given updated time stamp of a first given order in the output stream and a latest updated time stamp among second given orders prior in sequence in the output stream.

(14) An apparatus including:
  at least one programmable hardware device configured to:
    receive, from each of plurality of first transmission control protocol (TCP) client circuits, at least one TCP segment representative of at least one data item; and
    for each data item, identify a last data byte (LDB) data packet in a given TCP segment containing an identifier indicating a LDB of a plurality of data bytes forming the data item;
    determine a time stamp for the data item based on a time indicated by a local clock at a time the LDB data packet of the data item is received at the at least one programmable hardware device; and
    generate at least one data item message for the data item, in which the at least one data item indicates the time stamp for the data item;
  at least one processor configured to:
    for each data item for which at least one data item message is generated:
    determine an updated time stamp based on a time offset associated with a given first TCP client circuit of the first TCP client circuits from which the data item is received, in which the time offset corresponds to a network path extending from the given first TCP circuit client to the at least one programmable hardware device, and in which each of the first TCP client circuits has a time offset corresponding to a network path extending respectively from the first TCP client circuit to the at least one programmable hardware device; and
    generate an updated order message indicating the updated time stamp; and
  in which the at least one programmable hardware device is configured to:
    assign a sequencer time stamp to each data item of an updated data item message having a time indicated by a sequencer clock at a time of receipt of the updated data item message at a sequencer of the at least one programmable hardware device;
    for each data item assigned a sequencer time stamp,
      in a first queue, order the data item in time sequence, starting with an earliest time, based on the updated time stamp;
      in a second queue, order the data item in time sequence, starting with an earliest time, based on the sequencer time stamp;
    for a given data item in the second queue, when the time of the sequencer clock is determined to be same as or after a sum of the sequencer time stamp for the given data item and a hold delay:
      remove the given data item from the second queue;
      include in an output stream, in time sequence order starting with an earliest time based on a respective updated time stamp, the updated data time message of the given data item and an updated data item message of each other data item in the first queue, if any, having an updated time stamp earlier than the updated time stamp of the given data item;
      remove, from the first queue, the given data item and, if in the first queue, the each other data item; and
      remove, from the second queue, the each data item, if in the second queue; and for each data item represented in the output stream, instruct at least two of a plurality of TCP server circuits to simultaneously transmit a second stream of output data packets representative of the data item represented in the output stream.

(15) The apparatus according to (14), in which a first data item of the at least data item is formed by a plurality of first data packets in the stream of data packets.

(16) The apparatus according to (14) or (15), in which a first data item of the at least data item is contained entirely within a single data packet of the stream of data packets.

(17) The apparatus according to any one of (14) to (16), in which the at least one first programmable hardware device is configured to route the at least one data item message to the at least one processor, in which the at least one data item message indicates the time offset corresponding to the data item of the at least one data item message.

(18) The apparatus according to any of (14) to (17), in which the at least one processor is configured to: receive, from the at least one programmable hardware device via a plurality of ports, given first data item messages for given first data items from the plurality of first TCP client circuits, in which each port corresponds to a given time offset associated with a given first TCP client circuit of the first TCP client circuits; and for each given first data item, determine an updated time stamp based on the given time offset of the port at which the respective given first data item message is received from the least one programmable hardware device.

(19) The apparatus according to any one of (14) to (18), in which the at least one processor is configured to: determine whether to adjust the hold delay based on monitoring a difference between a given updated time stamp of a first given order in the output stream and a latest updated time stamp among second given orders prior in sequence in the output stream.

(20) A method including controlling, by at least one programmable hardware device:
  receiving, from each of plurality of first transmission control protocol (TCP) client circuits, at least one TCP segment representative of at least one data item; and
  for each data item, identifying a last data byte (LDB) data packet in a given TCP segment containing an identifier indicating a LDB of a plurality of data bytes forming the data item;
  determining a time stamp for the data item based on a time indicated by a local clock at a time the LDB data packet of the data item is received at the at least one programmable hardware device; and
  generating at least one data item message for the data item, in which the at least one data item indicates the time stamp for the data item; and
  controlling, by at least one processor:
    for each data item for which at least one data item message is generated:
    determining an updated time stamp based on a time offset associated with a given first TCP client circuit of the first TCP client circuits from which the data item is received, in which the time offset corresponds to a network path extending from the given first TCP circuit client to the at least one programmable hardware device, and in which each of the first TCP client circuits has a time offset corresponding to a network path extending respectively from the first TCP client circuit to the at least one programmable hardware device; and generating an updated order message indicating the updated time stamp; and controlling, by the at least one programmable hardware device:

assigning a sequencer time stamp to each data item of an updated data item message having a time indicated by a sequencer clock at a time of receipt of the updated data item message at a sequencer of the at least one programmable hardware device;

for each data item assigned a sequencer time stamp, in a first queue, ordering the data item in time sequence, starting with an earliest time, based on the updated time stamp;

in a second queue, ordering the data item in time sequence, starting with an earliest time, based on the sequencer time stamp;

for a given data item in the second queue, when the time of the sequencer clock is determined to be same as or after a sum of the sequencer time stamp for the given data item and a hold delay:

removing the given data item from the second queue;

including in an output stream, in time sequence order starting with an earliest time based on a respective updated time stamp, the updated data time message of the given data item and an updated data item message of each other data item in the first queue, if any, having an updated time stamp earlier than the updated time stamp of the given data item;

removing, from the first queue, the given data item and, if in the first queue, the each other data item; and removing, from the second queue, the each data item order, if in the second queue; and for each data item represented in the output stream, instructing at least two of a plurality of TCP server circuits to simultaneously transmit a second stream of output data packets representative of the data item represented in the output stream.

Although the disclosure herein has been described with reference to particular examples, it is to be understood that these examples are merely illustrative of the principles of the disclosure. It is therefore to be understood that numerous modifications may be made to the examples and that other arrangements may be devised without departing from the spirit and scope of the disclosure as defined by the appended claims. Furthermore, while particular processes are shown in a specific order in the appended drawings, such processes are not limited to any particular order unless such order is expressly set forth herein. Rather, various steps can be handled in a different order or simultaneously, and steps may be omitted or added.

The invention claimed is:

1. A system comprising:

at least one first programmable integrated circuit communicatively coupled to a plurality of first client devices, in which the at least one first programmable integrated circuit is configured to:

receive, from each of the first client devices, a stream of data packets representative of at least one order; and for each order of the at least one order, identify a last data byte (LDB) data packet in the stream of data packets containing an identifier indicating a LDB of a plurality of data bytes forming the order;

determine a time stamp for the order based on a time indicated by a time stamp clock at a time of receipt of the LDB data packet of the order at the at least one first programmable integrated circuit; and generate at least one order message for the order, in which the at least one order message indicates the time stamp for the order;

at least one processor configured to:

for each order for which at least one order message is generated:

determine an updated time stamp based on a time offset associated with a given first client device of the first client devices from which the order is received, in which the time offset corresponds to a network path extending from the given first client device to the at least one first programmable integrated circuit, and in which each of the first client devices has a time offset corresponding to a network path extending respectively from the first client device to the at least one first programmable integrated circuit; and generate an updated order message indicating the updated time stamp;

a sequencer of at least one second programmable integrated circuit configured to:

receive a plurality of updated order messages for the respective orders;

assign a sequencer time stamp to each of the respective orders corresponding to a time indicated by a sequencer clock at a time of receipt of the updated order message corresponding to the respective order at the sequencer;

in a first queue, order the respective orders in time sequence, starting with an earliest time, based on the updated time stamps;

in a second queue, order the respective orders in time sequence, starting with an earliest time, based on the sequencer time stamps;

compare a time of the sequencer clock with the sequencer time stamps of the respective orders in the second queue, when, for a given order in the second queue, the time of the sequencer clock is determined to be same as or after a sum of the sequencer time stamp for the given order and a hold delay:

remove the given order from the second queue;

interleave into an output stream, in time sequence order starting with an earliest time based on a respective updated time stamp, the updated order message of the given order and an updated order message of each other order in the first queue, if any, having an updated time stamp earlier than the updated time stamp of the given order;

remove, from the first queue, the given order and, if in the first queue, the each other order; and remove, from the second queue, the each other order, if in the second queue; and a fanout circuit of the at least one second programmable integrated circuit communicatively coupled to a plurality of server circuits, in which the fanout circuit is configured to:

for each order represented in the output stream, instruct at least two of the server circuits to simultaneously transmit a second stream of output data packets representative of the order represented in the output stream.

2. The system of claim 1, in which a first order of the at least one order is formed by a plurality of first data packets in the stream of data packets.

3. The system of claim 1, in which a first order of the at least one order is contained entirely within a single data packet of the stream of data packets.

4. The system of claim 3, in which the single data packet includes a LDB of a sequence of data bytes forming a second order of the at least one order, in which a LDB of the first order is closer to an end of the single data packet than the LDB of the second order, and
in which the at least one first programmable integrated circuit is configured to determine, for the single data packet:
a first given time stamp for the first order corresponding to a time of receipt of the single data packet at the at least one first programmable integrated circuit, and
a second given time stamp for the second order that is a predetermined time before the first given time stamp, in which a time difference between the first given time stamp and the second given time stamp is a function of a size of data of the second order in the single data packet.

5. The system of claim 1, in which the at least one first programmable integrated circuit is configured to:
for a first order represented in the stream of data packets, generate a single first order message containing all order data for the first order and indicating a first time stamp corresponding to a time of receipt of a LDB data packet in the stream of data packets containing an identifier indicating a LDB of a sequence of data bytes forming the first order.

6. The system of claim 5, in which the single first order message indicates a first time offset obtained from a memory and associated with a given first client device of the first client devices from which the first order is received.

7. The system of claim 1, in which the at least one first programmable integrated circuit is configured to:
for a first order represented in the stream of data packets:
generate a first order message for the first order indicating a first time stamp corresponding to a time of receipt of a LDB first data packet in the stream of data packets containing an identifier indicating a LDB of a sequence of data bytes forming the first order;
generate a second order message for the first order containing data of the first order as a single data packet; and
provide the first order message followed by the second order message to an order entry gateway of the system.

8. The system of claim 7, in which the first order message or the second order message indicates a first time offset obtained from a memory and associated with a given first client device of the first client devices from which the first order is received.

9. The system of claim 1, in which the at least one first programmable integrated circuit is configured to route the at least one order message to the at least one processor, in which the at least one order message indicates the time offset corresponding to the order of the at least one order message.

10. The system of claim 1, in which the at least one processor is configured to:
receive, from the at least one first programmable integrated circuit via a plurality of ports, given first order messages for given first orders from the plurality of first client devices, in which each port corresponds to a given time offset associated with a given first client device of the first client devices; and
for each given first order, determine an updated time stamp based on the given time offset of the port at which the respective given first order message is received from the least one first programmable integrated circuit.

11. The system of claim 2 further comprising:
the plurality of first client devices; and
the plurality of server circuits,
in which the fanout circuit is communicatively coupled with the server circuits and configured to:
interleave given updated order messages corresponding respectively to the given orders, into the output stream; and
instruct the server circuits to simultaneously transmit each of the given first orders represented in the output stream as a plurality of output data packets to a remote computing device.

12. The system of claim 1, in which at least one of the at least one first and second programmable integrated circuits is a programmable hardware device including a field programmable gate array (FPGA).

13. The system of claim 1, in which the at least one processor is configured to:
determine whether to adjust the hold delay based on monitoring a difference between a given updated time stamp of a first given order in the output stream and a latest updated time stamp among second given orders prior in sequence in the output stream.

14. An apparatus comprising:
at least one programmable hardware device configured to:
receive, from each of plurality of first client devices, at least one stream of data packets representative of at least one data item; and
for each data item,
identify a last data byte (LDB) data packet containing an identifier indicating a LDB of a plurality of data bytes forming the data item;
determine a time stamp for the data item based on a time indicated by a local clock at a time the LDB data packet of the data item is received at the at least one programmable hardware device; and
generate at least one data item message for the data item, in which the at least one data item indicates the time stamp for the data item; and
at least one processor configured to:
for each data item for which at least one data item message is generated:
determine an updated time stamp based on a time offset associated with a given first client device of the first client devices from which the data item is received, in which the time offset corresponds to a network path extending from the given first client device to the at least one programmable hardware device, and in which each of the first client devices has a time offset corresponding to a network path extending respectively from the first client device to the at least one programmable hardware device; and
generate an updated data item message indicating the updated time stamp; and
in which the at least one programmable hardware device is configured to:
assign a sequencer time stamp to each data item of an updated data item message having a time indicated by a sequencer clock at a time of receipt of the updated data item message at a sequencer of the at least one programmable hardware device;

for each data item assigned a sequencer time stamp,
in a first queue, order the data item in time sequence, starting with an earliest time, based on the updated time stamp;
in a second queue, order the data item in time sequence, starting with an earliest time, based on the sequencer time stamp;

for a given data item in the second queue, when the time of the sequencer clock is determined to be same as or after a sum of the sequencer time stamp for the given data item and a hold delay:
remove the given data item from the second queue;
include in an output stream, in time sequence order starting with an earliest time based on a respective updated time stamp, the updated data time message of the given data item and an updated data item message of each other data item in the first queue, if any, having an updated time stamp earlier than the updated time stamp of the given data item;
remove, from the first queue, the given data item and, if in the first queue, the each other data item; and
remove, from the second queue, the each data item, if in the second queue; and for each data item represented in the output stream, instruct at least two of a plurality of server circuits to simultaneously transmit a second stream of output data packets representative of the data item represented in the output stream.

15. The apparatus of claim 14, in which a first data item of the at least data item is formed by a plurality of first data packets in the stream of data packets.

16. The apparatus of claim 14, in which a first data item of the at least data item is contained entirely within a single data packet of the stream of data packets.

17. The apparatus of claim 14, in which the at least one first programmable hardware device is configured to route the at least one data item message to the at least one processor, in which the at least one data item message indicates the time offset corresponding to the data item of the at least one data item message.

18. The apparatus of claim 14, in which the at least one processor is configured to:
receive, from the at least one programmable hardware device via a plurality of ports, given first data item messages for given first data items from the plurality of first client devices, in which each port corresponds to a given time offset associated with a given first client device of the first client devices; and
for each given first data item, determine an updated time stamp based on the given time offset of the port at which the respective given first data item message is received from the least one programmable hardware device.

19. The apparatus of claim 14, in which the at least one processor is configured to:
determine whether to adjust the hold delay based on monitoring a difference between a given updated time stamp of a first given order in the output stream and a latest updated time stamp among second given orders prior in sequence in the output stream.

20. A method comprising:
controlling, by at least one programmable hardware device:
receiving, from each of plurality of first client device, at least one stream of data packets representative of at least one data item; and
for each data item,
identifying a last data byte (LDB) data packet containing an identifier indicating a LDB of a plurality of data bytes forming the data item;
determining a time stamp for the data item based on a time indicated by a local clock at a time the LDB data packet of the data item is received at the at least one programmable hardware device; and
generating at least one data item message for the data item, in which the at least one data item indicates the time stamp for the data item; and
controlling, by at least one processor:
for each data item for which at least one data item message is generated:
determining an updated time stamp based on a time offset associated with a given first client device of the first client devices from which the data item is received, in which the time offset corresponds to a network path extending from the given first client device to the at least one programmable hardware device, and in which each of the first client devices has a time offset corresponding to a network path extending respectively from the first client device to the at least one programmable hardware device; and
generating an updated order message indicating the updated time stamp; and
controlling, by the at least one programmable hardware device:
assigning a sequencer time stamp to each data item of an updated data item message having a time indicated by a sequencer clock at a time of receipt of the updated data item message at a sequencer of the at least one programmable hardware device;
for each data item assigned a sequencer time stamp,
in a first queue, ordering the data item in time sequence, starting with an earliest time, based on the updated time stamp;
in a second queue, ordering the data item in time sequence, starting with an earliest time, based on the sequencer time stamp;
for a given data item in the second queue, when the time of the sequencer clock is determined to be same as or after a sum of the sequencer time stamp for the given data item and a hold delay:
removing the given data item from the second queue;
including in an output stream, in time sequence order starting with an earliest time based on a respective updated time stamp, the updated data time message of the given data item and an updated data item message of each other data item in the first queue, if any, having an updated time stamp earlier than the updated time stamp of the given data item;
removing, from the first queue, the given data item and, if in the first queue, the each other data item; and
removing, from the second queue, the each data item order, if in the second queue; and for each data item represented in the output stream, instructing at least two of a plurality of server circuits to simultaneously transmit a second stream of output data packets representative of the data item represented in the output stream.

\* \* \* \* \*